United States Patent [19]

Potash et al.

[11] Patent Number: 4,760,518
[45] Date of Patent: Jul. 26, 1988

[54] BI-DIRECTIONAL DATABUS SYSTEM FOR SUPPORTING SUPERPOSITION OF VECTOR AND SCALAR OPERATIONS IN A COMPUTER

[75] Inventors: Hanan Potash; Erick M. Cook, both of La Jolla; Andrew E. Phelps, San Diego; Mark A. Haakmeester; Jennifer S. Schuh, both of Encinitas; William B. Thompson, San Diego, all of Calif.

[73] Assignee: Scientific Computer Systems Corporation, Wilsonville, Oreg.

[21] Appl. No.: 835,129

[22] Filed: Feb. 28, 1986

[51] Int. Cl.[4] .................. G06F 3/00; G06F 13/00; G06F 13/40; G06F 15/347
[52] U.S. Cl. ................................... 364/200; 364/730
[58] Field of Search ... 364/200 MS File, 900 MS File, 364/300, 730

[56] References Cited

U.S. PATENT DOCUMENTS

| | | | |
|---|---|---|---|
| 3,573,851 | 4/1971 | Watson et al. | 364/200 |
| 3,573,852 | 4/1971 | Watson et al. | 364/200 |
| 3,573,853 | 4/1971 | Watson et al. | 364/200 |
| 3,573,854 | 4/1971 | Watson et al. | 364/200 |
| 4,101,960 | 7/1978 | Stokes et al. | 364/200 |
| 4,128,880 | 12/1978 | Cray, Jr. | 364/200 |
| 4,344,134 | 8/1982 | Barnes et al. | 364/200 |
| 4,365,292 | 12/1982 | Barnes et al. | 364/200 |
| 4,393,465 | 7/1983 | Potash | 364/900 |
| 4,435,765 | 3/1984 | Uchida et al. | 364/200 |
| 4,507,726 | 3/1985 | Grinberg et al. | 364/200 |

OTHER PUBLICATIONS

Convex Computer Corporation publication on "Convex C-1 Computer System", 1984.
Cray X-MP Series Mainframe Reference Manual, Cray Research, Inc. 1982.

Primary Examiner—Raulfe B. Zache
Assistant Examiner—Robert B. Harrell
Attorney, Agent, or Firm—Brown, Martin, Haller & Meador

[57] ABSTRACT

A bi-directional databusing system is used in a computer that superposes vector and scalar operations. The computer consists of a main memory, a plurality of pipelined functional units, and a buffer for staging scalar and vector data objects between the main memory and the functional units. The busing system supports two-way data transfer during each of a succession of bus transfer cycles in which data is transferred to the buffer during one phase of a cycle, and from the buffer during a second cycle phase. The busing system includes three sets of bi-directional memory databuses, one for transferring scalar data objects between the main memory and buffer unit, and the other two for transferring vector data objects between the main memory and the buffer. The bus system also includes a set of bi-directional function buses, each for transferring scalar and vector data objects between the buffer and the functional units, with the ratio of the number of data objects transferred to the functional units during a transfer cycle to the number of data objects transferred to the buffer during the same cycle corresponding to a predetermined parametric value.

12 Claims, 18 Drawing Sheets

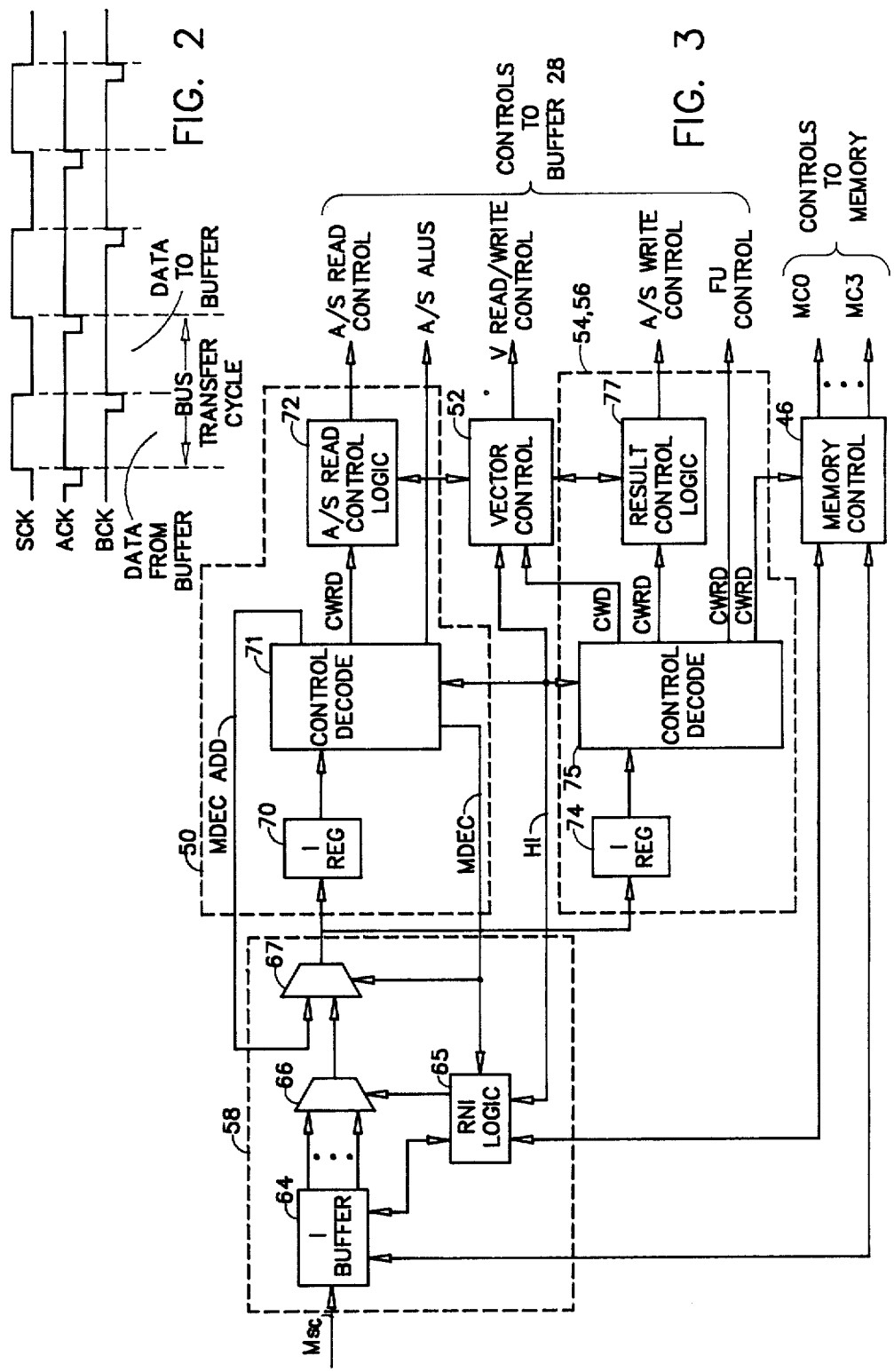

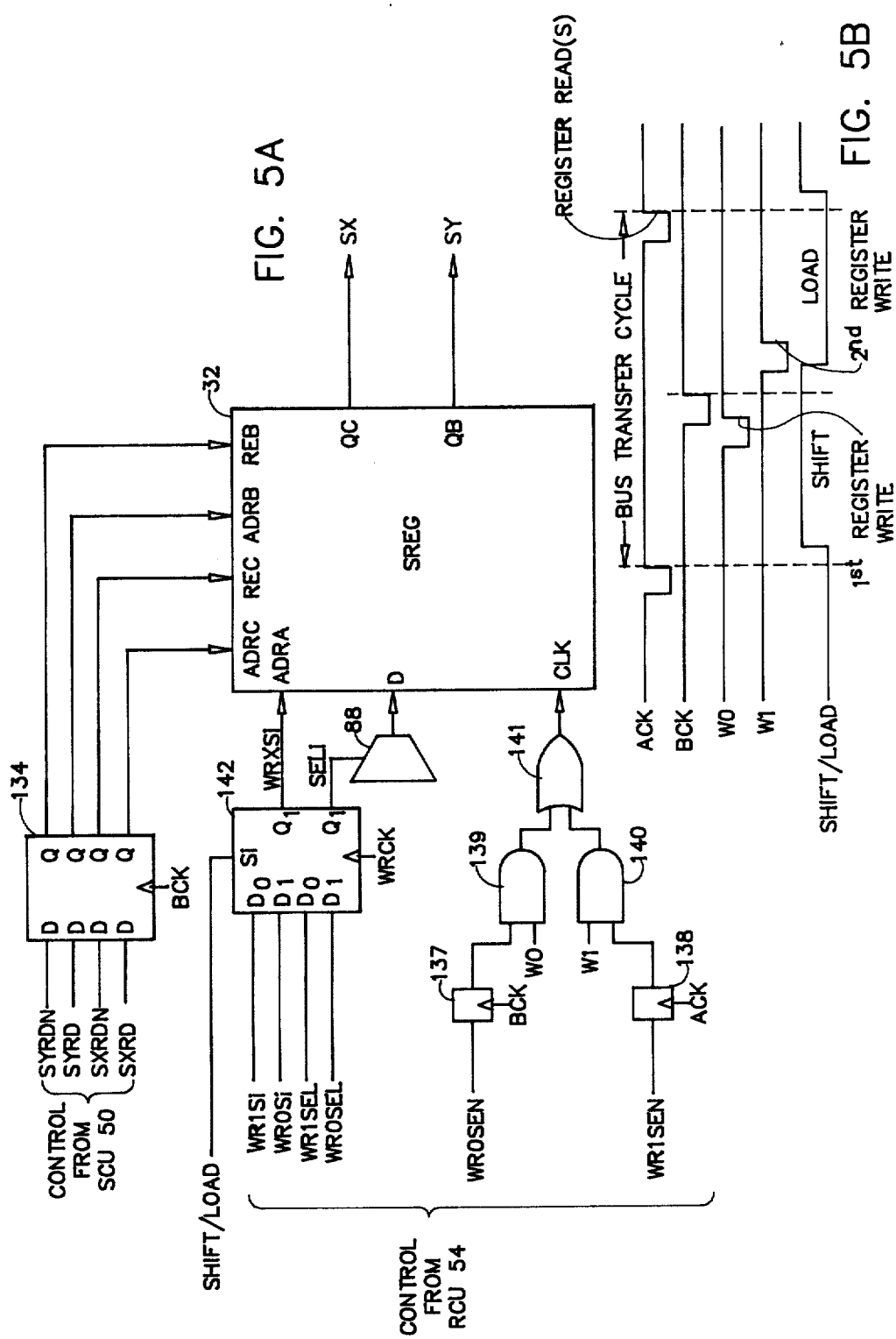

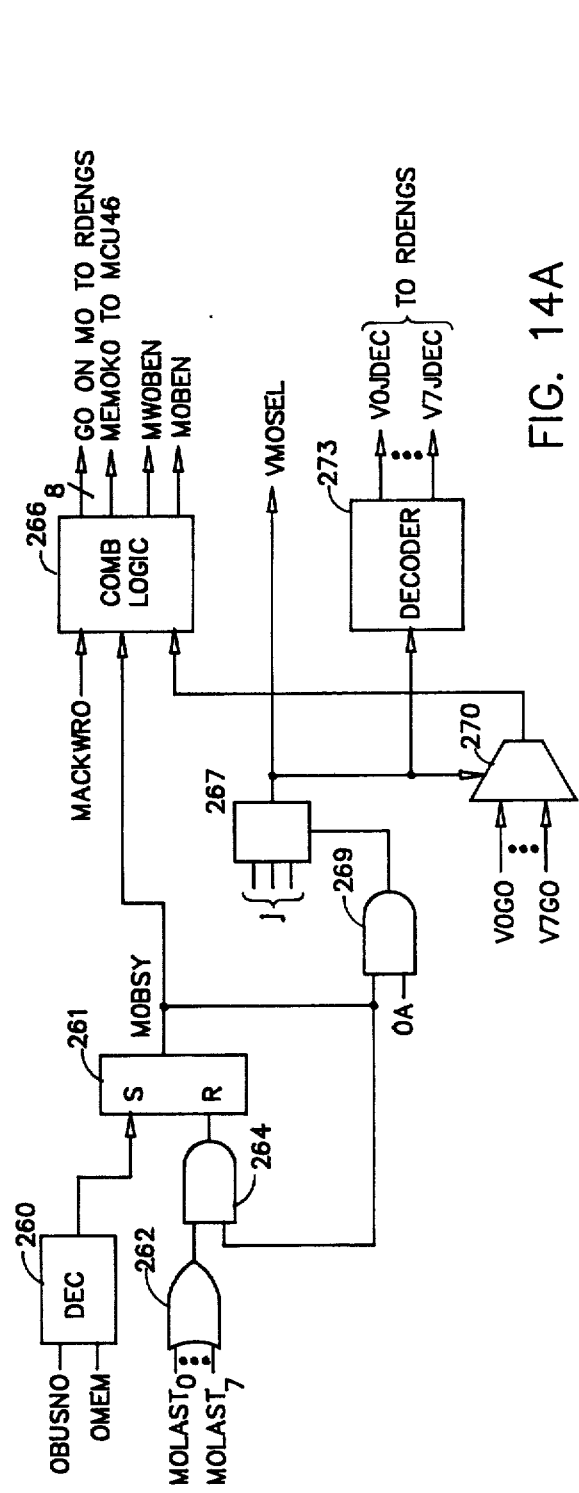

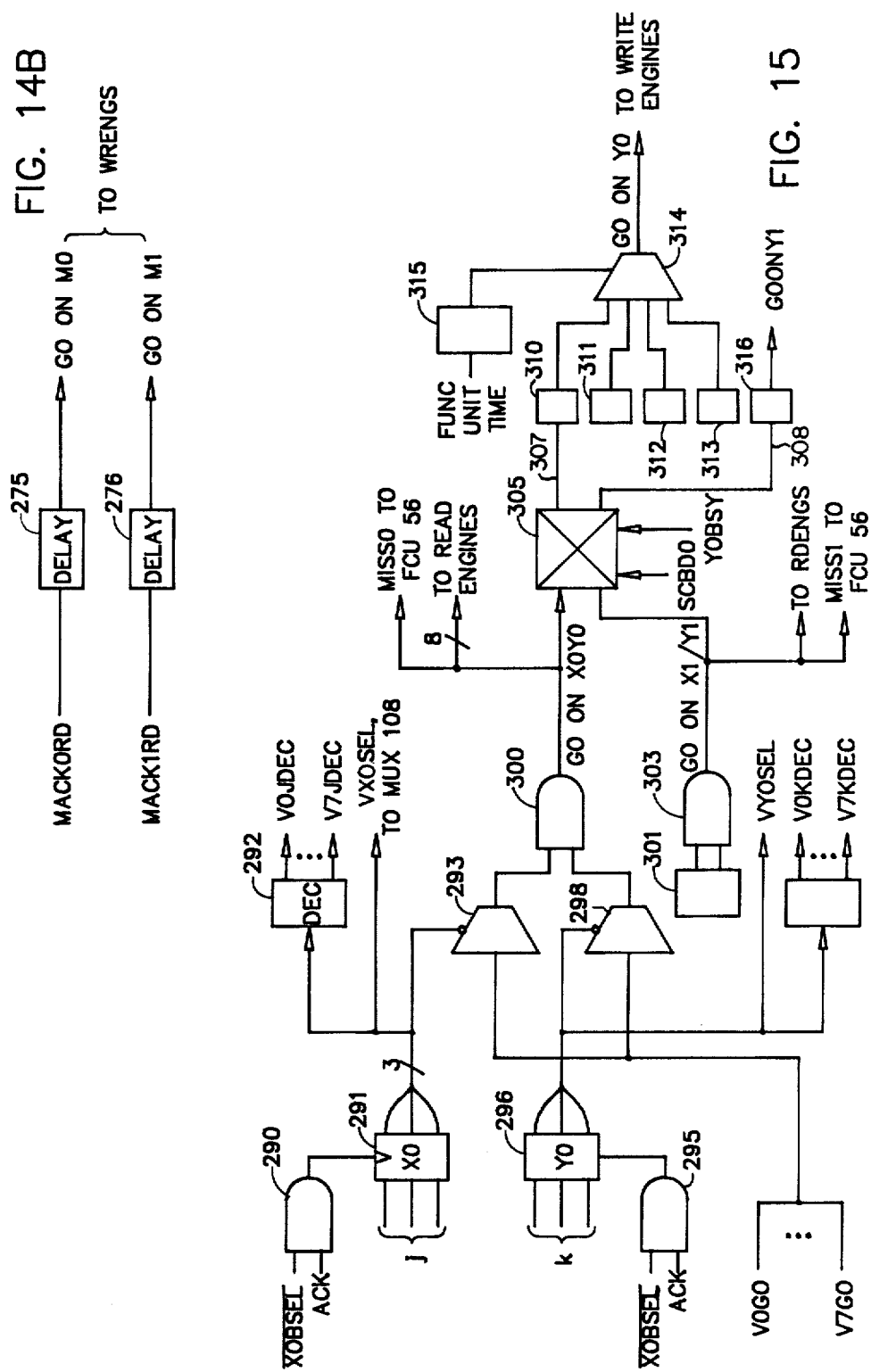

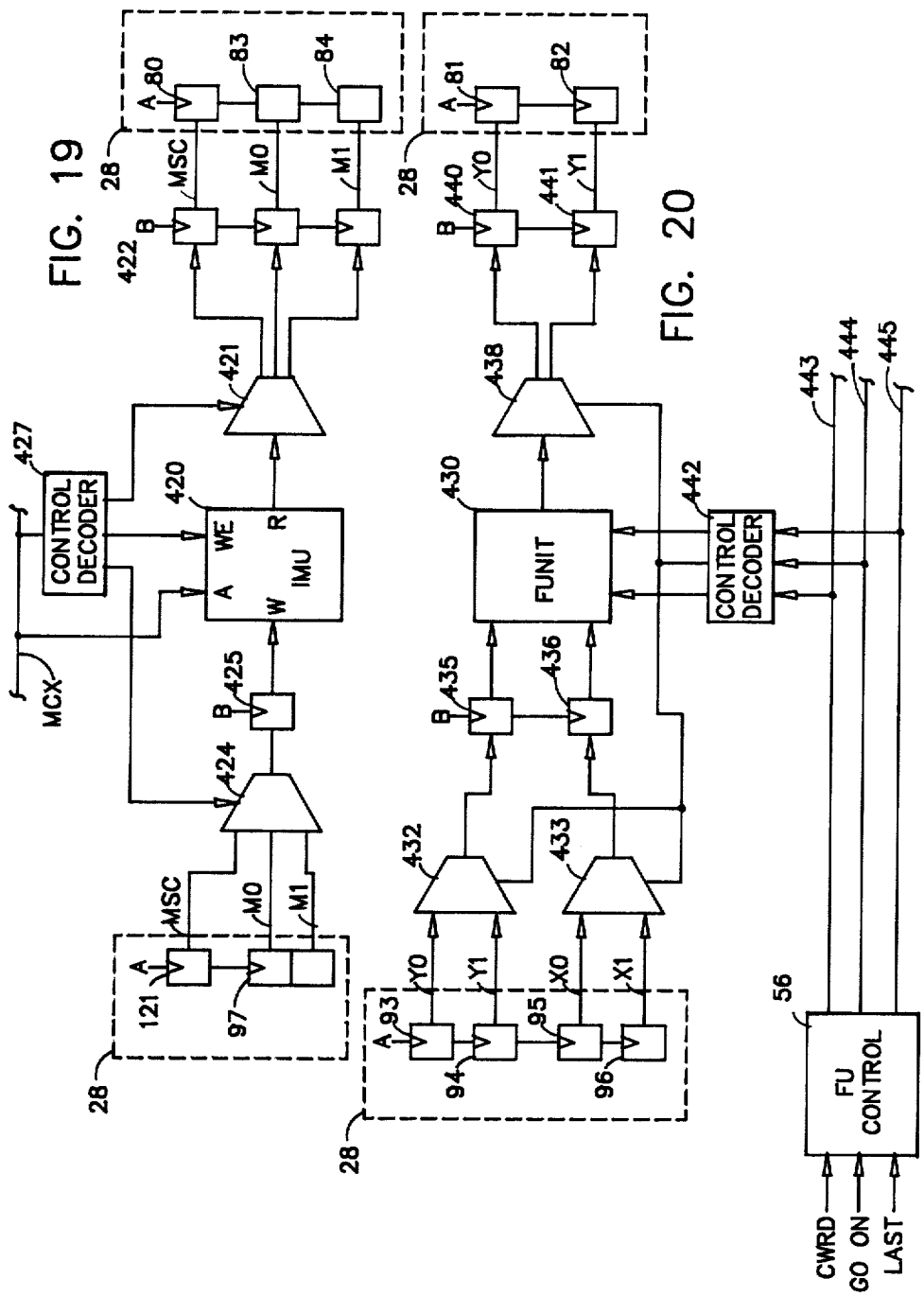

BI-DIRECTIONAL DATABUS SYSTEM FOR SUPPORTING SUPERPOSITION OF VECTOR AND SCALAR OPERATIONS IN A COMPUTER

BACKGROUND OF THE INVENTION

The present invention is in the field of digital computers that perform scalar and vector operations. More specifically, the invention concerns the use of bi-directional data busing in a computer that superposes scalar and vector data operations.

The concepts of scalar and vector organization of digital computing machines are well understood in the art. The family of computers marketed by International Business Machines Corporation under the name System 370 is representative of scalar computing, while the Cray-1 computer available from Cray Research, Inc. exemplifies vector processing machines.

Scalar processing refers to the performance of an arithmetical or logical function on a pair of unidimensional, operand data objects to produce a single result. To perform the function, the operands must be retrieved from memory, provided to the functional unit, and the result returned to memory. Each step in the compound sequence—extraction of the operands from memory, transfer of the operands to registers, performance of the operation, transfer of the result back to memory—requires execution of one or more instructions.

The architecture and operation of a vector computer are based on the observation that an identical function can be performed on each of a succession of related data objects in response to a single instruction. A vector machine responds to a vector instruction by beginning a process of streaming a plurality of related unidimensional data objects, referred to collectively as a vector, from one point to another. Vector computers are characterized in that at least two operand vectors can be streamed to the same functional unit in response to a single instruction, such as an instruction to add two vectors. The functional unit combines the streamed vectors in some predetermined way to produce a single result vector.

It has been recognized that highly efficient computing can be realized by an architecture containig both scalar and vector capabilities. The integration of scalar and vector structures into a single construct is referred to as superposition. Superposition results in a machine that can use software compatible with existing scalar and vector systems to achieve the speed inherent in vector processing, while enjoying the precision and flexibility of scalar processing.

The concept of superposition can be appreciated when the following Fortran programming fragment is considered:

DO 5, I=1, 64

$A(I) = (B(I) + C(I))*D(I)$

5 CONTINUE

In this fragment, three data objects, B(I), C(I) and D(I), are combined in each of a series of 64 functionally identical steps. In a scalar computer, each of the 64 iterations would involve obtaining a pair of indexed operands from storage, performing the indicated functions, and returning the results, A(I), to storage. A vector computer would treat each of the operands B, C, and D, and the result A as respective n-unit vectors, for example. Then, the vector computer would obtain each of the n-unit operands B and C from memory in one or more streaming operations; initiate a second streaming operation to concurrently provide the B and C operands to a functional unit to be added; and store the result of the addition as an n-unit result vector in a third streaming operation. During the time that the operands B and C are being added, the third operand D would be obtained from memory and held in temporary storage to be combined with the temporary result of adding B and C. The result of multiplying the 64-unit D vector with the n-unit temporary result vector would be returned to storage as the n-unit A vector. A computer superpositioning scalar and vector operations in this example would employ concurrent scalar and vector operations, using the scalar operations to calculate the starting and ending indices for the operand and result vectors, and vector techniques to perform the memory references and functional operations on the indexed vectors.

A computer architecture integrating scalar and vector operations characteristically operates on data elements or words of predetermined length. For example, the unit data element in the above-referenced Cray-1 computer consists of a 64-bit word; scalar data objects usually include single words, while vector data objects can consist of ordered arrays of from 1 to 64 (or more) words.

Typically, a computer which superpositions scalar and vector operations has a main memory consisting of a plurality of interleaved individual memory units in which multiple units can be concurrently accessed by simultaneous processes for storage or retrieval. Superposition also requires the provision of a plurality of functional units, each for performing a specified arithmetic or logical function. Normally the functional units have pipelined structures which permit them to receive a set of operands for one operation while still processing a set of operands for a previous operation. Such functional units are normally used for vector operations, although some are used also for performance of floating point operations on scalar operands. The superpositioning computer typically also provides dedicated arithmetic and logic units for scalar (and address) operations. Finally, the architecture of the superpositioning computer normally includes a bank of scalar and vector registers that act as buffers or caches between memory and functional units. The primary purpose of positioning buffer registers between memory and the functional units is to reduce memory access time in scalar operations and to increase memory throughput in vector operations.

A scalar buffer obtains from memory and temporarily stores scalar data objects demanded by currently-executing processes: the scalar buffer includes registers that are characteristically faster than main memory. The vector buffer has registers which reduce the access time to main memory and also increase the throughput through the memory by eliminating the need to store intermediate results of vector operations: retention of the intermediate results of a vector operation in the buffers permits the allocation of more of the memory bandwidth to the provision of primary operands and storage of final results.

The Cray X-MP provides the most current example of a computer which superposes scalar and vector operations and which has an architecture including the elements previously discussed. In this machine, connectivity between the architectural blocks is provided on unidirectional data paths. For each operational section of the computer there is a separate set of data paths. Thus, for vector operations there is a set of data paths between the main memory and the vector registers and another set of data paths between the vector registers and each of the functional units. Further, in each set of data paths there are unidirectional paths for conducting vector data objects from the vector registers and other, separate data paths for conducting vector data objects to the vector registers. The proliferation of unidirectional data paths in the prior art superpositioning computers exacts significant physical and economic penalties. First, the physical design of such computers requires the provision of a plethora of point-to-point data paths and expands the physical resources required to interconnect the architectural blocks of the computers. Second, the cost of physical resources for such an interconnection adds significantly to the total cost of the computer.

Interconnection technology in purely scalar computers in which the primary architectural blocks of the computer are connected and over which all memory, operand, and result transfers are conducted includes the use of a bi-directional databus. Such a data transfer structure is inapplicable to the superpositioning computer because it does not permit the scalar and vector processes to have independent, but concurrent data paths to and from memory. Such an independent memory data connection structure is necessary because it permits the scalar section to fully perform all indexing calculations without interfering with the concurrently-operating vector processes that require the indices. Further, a traditional scalar databus, as is presently used, would do away with the response time and throughput benefits provided by scalar and vector buffering.

Thus, there is an evident need in the field of superpositioning computers to reduce the amount of physical resources required to support data interconnection, which need is not fulfilled by traditional databus structure upon which all data transfers in a computer are made.

It is therefore the primary objective of the present invention to advance a data transfer system for use in a computer which superposes scalar and vector operations, which will reduce the physical dimensions of the data interconnection resources of the computer, yet which will retain the benefits of quick response time and efficient throughput realized by the computer's architecture.

SUMMARY OF THE INVENTION

The invention is based on the critical observation that the architecture and operation of a superposing computer can be fully maintained by the provision of bi-directional databuses between the memory and buffer sections and between the buffer and functional unit sections of such a computer. The bi-directional buses eliminate the need for dedicated point-to-point data interconnect paths, thereby reducing the portion of the physical volume of the computer attributable to data interconnect.

The invention operates in the context of a computer which superposes scalar and vector operations in an architecture having a main memory, pipelined functional units, and a buffer having scalar and vector registers.

The invention provides a bi-directional databus system for transferring scalar and vector data objects between the memory and the buffer and between the buffer and the functional units. The databus system includes a control facility responsive to a sequence of instructions which provides memory reference control signals in response to memory reference instructions in the sequence and operand and result control signals in response to functional execution instructions in the sequence. A set of three bi-directional databuses connect the main memory and the buffer and respond to memory reference control signals by conducting scalar and vector data objects between the main memory and the buffer during consecutive multiphase bus transfer cycles. The system of the invention also includes two sets of bi-directional functional buses connected between the buffer and the functional units for transferring scalar and vector operands from the buffer to the functional units while concurrently transferring results from the functional units to the buffer during consecutive bus transfer cycles, where the ratio of the number of operands to the number of results transferred during any bus transfer cycle corresponds to a predetermined parametric value.

Databus transfer in the system of the invention provides for conduction of data objects from the buffer on any bus during a first phase of each bus transfer cycle and for conduction of data objects to the buffer on any bus during a second phase of each bus transfer cycle.

BRIEF DESCRIPTION OF THE DRAWINGS

FIG. 2 is a timing diagram illustrating a bus transfer cycle.

FIG. 3 is a more detailed block diagram of the instruction decoding section of the computer of FIG. 1.

FIG. 5A is a block diagram showing structure and control of a scalar (S) register; FIG. 5B is a timing diagram illustrating operation of the S register.

FIG. 13 is a block diagram of a result bus scheduler in the vector control unit.

FIGS. 14A and 14B are block diagrams of memory bus schedulers in the vector control unit.

FIG. 15 is a block diagram of a result scheduler in the vector control unit.

FIG. 19 is a block diagram illustrating the interconnection of a memory unit with the memory databuses of the invention.

FIG. 20 is a block diagram illustrating the interconnection of a functional unit with the operand and result buses of the invention.

DETAILED DESCRIPTION OF THE PREFERRED EMBODIMENT

Figure 1:
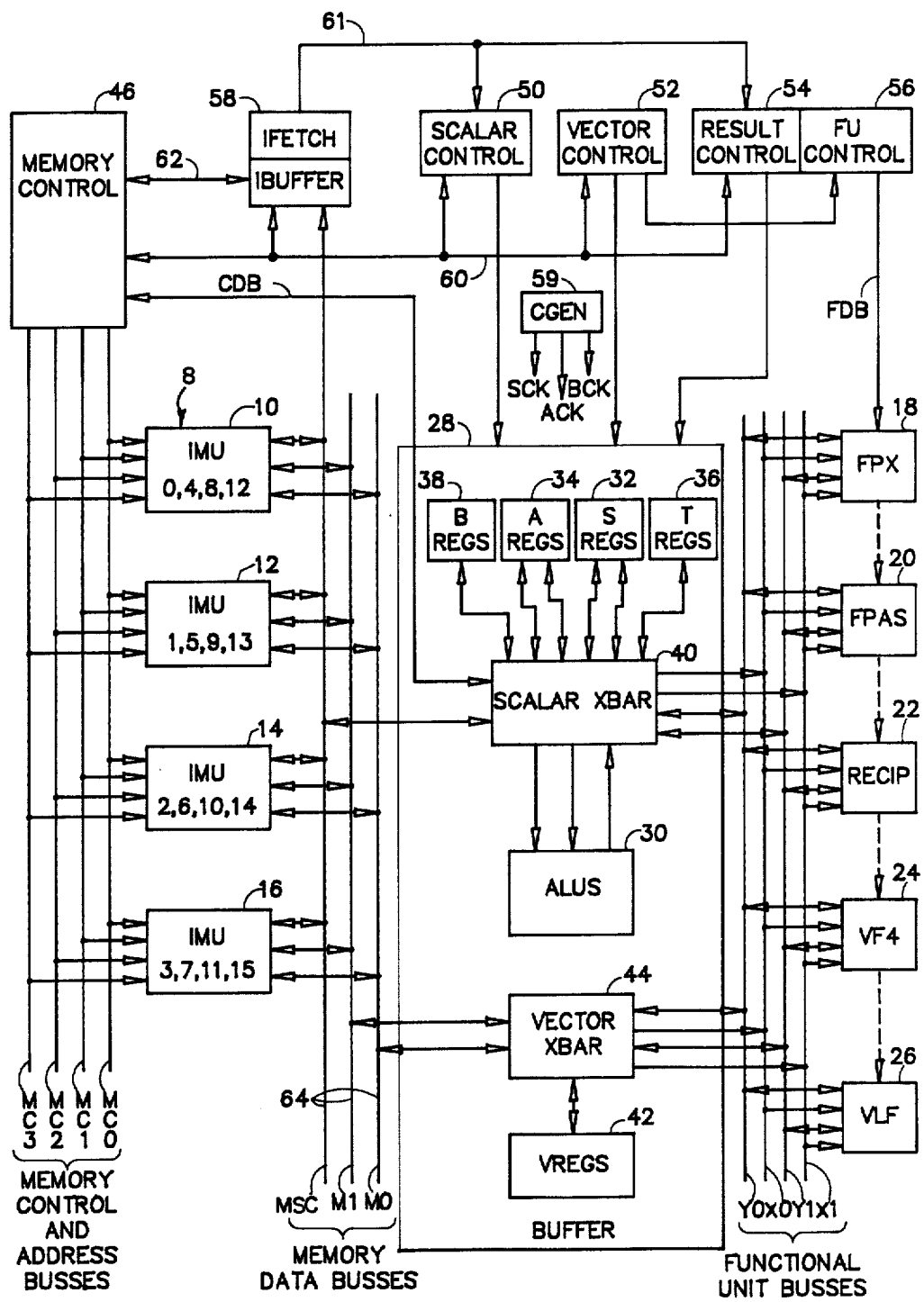
FIG. 1 is a block diagram illustrating the system of the invention in its operative environment.

The operation of the bi-directional bus transfer system of the invention can best be understood with reference to FIG. 1, which illustrates the basic architecture of a computer which superpositions scalar and vector operations. The computer includes a main memory consisting of four interleaved memory units (IMU's) 10-16. Each of the IMU's includes four individually accessible segments which are interleaved with the four segments of the other three IMU's. Memory unit interleaving is a technique well known in the art: see, for example, Hwang and Briggs, *Computer Architecture And Parallel Processing*, McGraw-Hill, 1984, pages 58-60. As explained in the Hwang and Briggs reference, interleaving is a method of distributing the addresses of individual memory modules such that as a memory reference operation consisting of a stream of individual references progresses, the operation must address consecutive memory unit segments. This permits consecutive access to sequentially addressed data words without waiting.

In the preferred embodiment each addressable memory location contains a 64-bit data element or word. In the context of scalar processing, the preferred data object is a single 64-bit word, referred to hereafter as a "scalar" or "scalar data object" or "scalar word." Each vector data object that is processed consists of from one to sixty-four 64-bit elements. In the description following, a vector data object may be referred to as a "vector."

Vector logical and computation and floating point arithmetic operations are performed in the computer of FIG. 1 by the functional units 18-26. The functional units are conventional processors which perform specific arithmetic or logic functions. The architecture of the functional units is conventional and each consists essentially of a pipelined processor. Exemplary architectures and operations of pipelined functional units are laid out in the Hwang and Briggs reference at, for example, pages 237-241.

A buffer section 28 is located between the main memory and the functional units. The purpose of the buffer section is to stage scalar and vector data objects between the main memory and the functional units and to provide temporary storage of intermediate results of vector operations. Scalar and address functional units are also located in the buffer section in the block indicated by reference numeral 30.

A set of scalar registers 32 and a set of address registers 34 are included in the buffer section. The scalar (S) registers consist of a set of eight 64-bit registers. There are twenty four 32-bit address (A) registers. Scalar operations are supported by another set of T registers 36, while address operations are supported by a separate set of B registers 38. A scalar crossbar (XBAR) 40 provides for routing scalar data objects into and out of the scalar, address, T and B registers.

The buffer section 28 includes a plurality of vector (V) registers 42. Preferably, there are eight vector registers, each capable of storing up to sixty-four 64-bit elements. A vector crossbar (XBAR) 44 provides for routing vector data objects to and from the vector registers 42.

The functions of the A, S, B, T, and V registers correspond essentially to those of identically-designated registers described in U.S. Pat. No. 4,128,880, incorporated herein by reference.

Control of the memory, register, and functional unit, and data exchange resources of the FIG. 1 computer is implemented by a memory control unit (MCU) 46, a scalar control unit (SCU) 50, a result control unit (RCU) 54, a vector control unit (VCU) 52, and a functional control unit (FCU) 56. An instruction unit 58 acts as an instruction cache, receiving a block of instructions from main memory and issuing the cached instructions one-by-one in a sequence paced by control signals from the control units. Any one of the scalar, result, or vector control units can prevent the instruction unit 58 from issuing an instruction as explained below.

A conventional clock generator (CGEN) 59 produces a system clock (SCK), A phase (ACK) and B phase (BCK) clocks, and a plurality of other clocks (not shown) necessary to synchronize the operation of the FIG. 1 computer.

The invention consists of a bi-directional busing system divided into two functional parts. The first functional part comprises a plurality of bi-directional memory databuses M0, M1, and MSC that interconnect the main memory and the buffer 28. Each of the memory databuses consists of 64 fully bi-directional data paths, and each is capable of conducting a 64-bit scalar or vector data element. The scalar memory databus MSC connects the main memory to the S, A, T, and B registers through the scalar crossbar 40. The memory databuses denoted as M0 and M1 transfer vector data objects between the main memory and the V registers 42 through the vector crossbar 44.

The MCU 46 controls all vector, scalar, and instruction accesses to the main memory over four memory control and address buses MC0-MC3. Each of the memory control and address buses permits an independently-operating memory control processor to conduct an independent memory reference process involving the transfer of scalar or vector data objects between the main memory and the buffer 28. One of the memory control buses, MC3, is dedicated to control of scalar memory transfers, while the other buses, MC0-MC2, are limited to controlling independent vector memory operations.

The second part of the databus system of the invention consists of a pair of functional databuses. Each of the functional databuses includes a pair of signal transfer paths. The first of these pairs is denoted as X0 and Y0 and the second is X1, Y1. Each of the X and Y signal transfer paths consists of a 64-bit wide data path capable of transferring a data element. The bus paths denoted by X in the functional unit bus pairs are unidirectional and conduct scalars and vectors from the buffer 28 to the functional units. The functional bus paths denoted by Y are bi-directional and conduct scalar or vector data objects in both directions between the buffer 28 and the functional units.

Data objects, whether scalar or vector, that flow on either the X or Y signal paths to the functional units, are called "operands." The data objects returned to the buffer 28 on the Y signal paths are "results."

Bus operations are synchronized by a system clock, SCLK, each cycle of which is termed a bus transfer cycle. A bus transfer cycle is illustrated in FIG. 2. Each bus transfer cycle is divided into two bus transfer phases by a pair of clocks, termed the A and B clocks. During the first phase, data elements can be transferred from the buffer section 28 to the main memory on databuses M0, M1, and MSC and to the functional units on both paths of each functional bus. This is referred to as the "data" phase of a transfer cycle. During the second, or "result," transfer phase of a bus transfer cycle, data elements can be transferred to the buffer section on the Y signal paths of the functional buses, and on all of the memory databuses. The time duration of a bus transfer cycle phase in the preferred embodiment corresponds to the time for one data element to travel one way between one of the crossbars 40 or 44 and either the main memory or one of the functional units. Thus, during a basic bus transfer cycle, up to four vector elements can be transferred between main memory and the buffer 28 on the M0 and M1 buses. Up to two scalar data elements can be transferred on the MSC bus during a bus cycle.

The operation of the functional buses during a bus transfer cycle is slightly different than that of the memory buses. During a bus cycle, two data elements can be transferred from the buffer to the functional units on each data path of the XY databuses during a cycle data phase, and one data element can be returned to the buffer on each of the two Y bus data paths during a cycle result phase. This conforms to the essential architecture of the functional unit processors, each of which operates on a pair of operand data objects to produce a single result data object.

Other signal lines necessary to an understanding of the operation of the databusing system of the invention in the context of FIG. 1 include a bi-directional databus that transfers base address and vector increment values from the buffer 28 to the memory control unit 46, and which is denoted as the CDATA bus (CDB). Another signal line 60 enables the memory, scalar, result, and vector control units 46–54 to prevent an instruction currently offered by the instruction unit 58 for issue from being issued. The currently-offered instruction is prevented from issuing if any of the control units 46–54 activate a hold issue (HI) signal. The hold issue signal not only prevents the current instruction from issuing, but also informs all of the other control units that the instruction is being held from issue and permits the units to take appropriate action, described further below. The instruction currently offered for issue is provided to the scalar and result control units on signal line 61, while control signals necessary for filling the instruction buffer section of the instruction unit 58 from memory are exchanged between the instruction unit 58 and the memory control 46 on signal line 62.

Finally, a functional unit databus (FDB) transfers control signals to the functional units from the FCU 56.

The control structure implemented in orchestrating the operations of the busing system consists essentially of decoding each instruction of a programmed instruction sequence to produce a corresponding command word specific to the data structure of the FIG. 1 computer.

As shown in FIG. 3, retrieval and sequencing of instructions is accomplished by the instruction unit 58 which includes an instruction buffer 64, read next instruction (RNI) logic 65, and multiplexers 66 and 67. The instruction buffer 64 fetches from main memory and holds in high speed storage those instructions that are most likely to be executed. The instructions are obtained from memory over the MSC bus in cooperation with the MCU 46. The RNI logic 65 maintains a program counter, fetches instructions from the instruction buffer 64, performs early detection of branches, initiates the filling of the instruction buffer, and selects through the provision of a control signal to the multiplexer 66, the next instruction to be decoded. The instruction selected by the multiplexer 66 is fed, through the multiplexer 67, to a pair of instruction decode and issue circuits, one in the scalar control unit 50 and the other in the result control unit 54.

The instruction decode and issue circuit of the SCU includes an instruction register 70, a control decoder 71, and an address and scaler (A/S) read control logic circuit 72. In the RCU 54, the instruction decode and issue circuit consists of an instruction register 74, a control decoder 75, and result control logic 77 that control writing to address and scaler (A/S) registers.

An instruction provided through the multiplexer 67 enters the instruction registers 70 and 74 which provide the instruction simultaneously to the control decode circuits 71 and 75. The control decode circuits are micro-programmed units, logically concatenated to provide a unique control word (CWRD) in response to each instruction. The control word resulting from instruction decoding is distributed to the control logics 72 and 77 and to the VCU 52 and the MCU 46 to synchronize the use of computer resources, including the databus system of the invention, that are required to execute the instruction. If the resources necessary to execution of the present instruction are not available, the control unit having cognizance over the unavailable resources will activate a hold issue (HI) signal that is provided to the other control units and to the RNI logic 65. The HI signal will cause the RNI logic 65 to prevent another instruction being provided through the multiplexer 66. In addition, the HI signal will cause the control units other than the one issuing the signal to suspend their response to the instruction in the I registers 70 and 74 until the control unit holding issue determines that its controlled resources are available for execution of the instruction.

The control signals required for synchronizing the use of resources in response to instructions are summarized on the right-hand side of FIG. 3. The SCU 50 provides A/S read control signals to the buffer 28 to orchestrate the extraction of data from address and scaler registers. The control decoder 71 in the SCU also provides the portion of the control word required to control the activity of address and scalar arithmetic and logic units. A portion of the control word is fed to the VCU 52 to permit it to develop the read and write control signals required for extraction of vector data objects from and entry of vector data objects into the vector registers. Control of entry of scalar data objects into the address and scalar registers is provided by the result control logic 77 in the RCU. The control decoder 75 also outputs control signals for the functional units and for the MCU 46. The MCU 46 responds to control signals during memory reference operation by developing control and address signals necessary to transfer data to and from the main memory 8 in response to a memory reference instruction.

In operation, the instruction buffer 64, RNI logic 65, and multiplexers 66 and 67 operate to provide a sequence of instructions to the instruction registers 70 and 74. The instructions are decoded and the control signals necessary to synchronize use of the resources in response to the instructions are provided. If resources required for the execution of the current instruction are not available, a hold issue (HI) signal will be produced that will temporarily halt the sequence of instructions until the resource has become available. The sequence of instructions is synchronized with the bus transfer cycles described above so that, without a HI signal, it is generally the case that an instruction will be decoded each bus transfer cycle.

In some cases that affect use of the databus system of the invention, two cycles are required to decode an instruction and to marshal the resources required for its execution. In this case, the control decoder 71 will issue a multiple decode (MDEC) signal that will cause the RNI logic 65 to prevent another instruction being provided through the multiplexer 66 and will control the multiplexer 67 to receive a multiple decoding address (MDEC ADD) output by itself. The multiple decoding address, fed through the multiplexer 67 and the registers 70 and 74, causes the control decoders 71 and 75 to produce another control word that implements the second stage of decoding the instruction.

BUFFER

Figure 4:
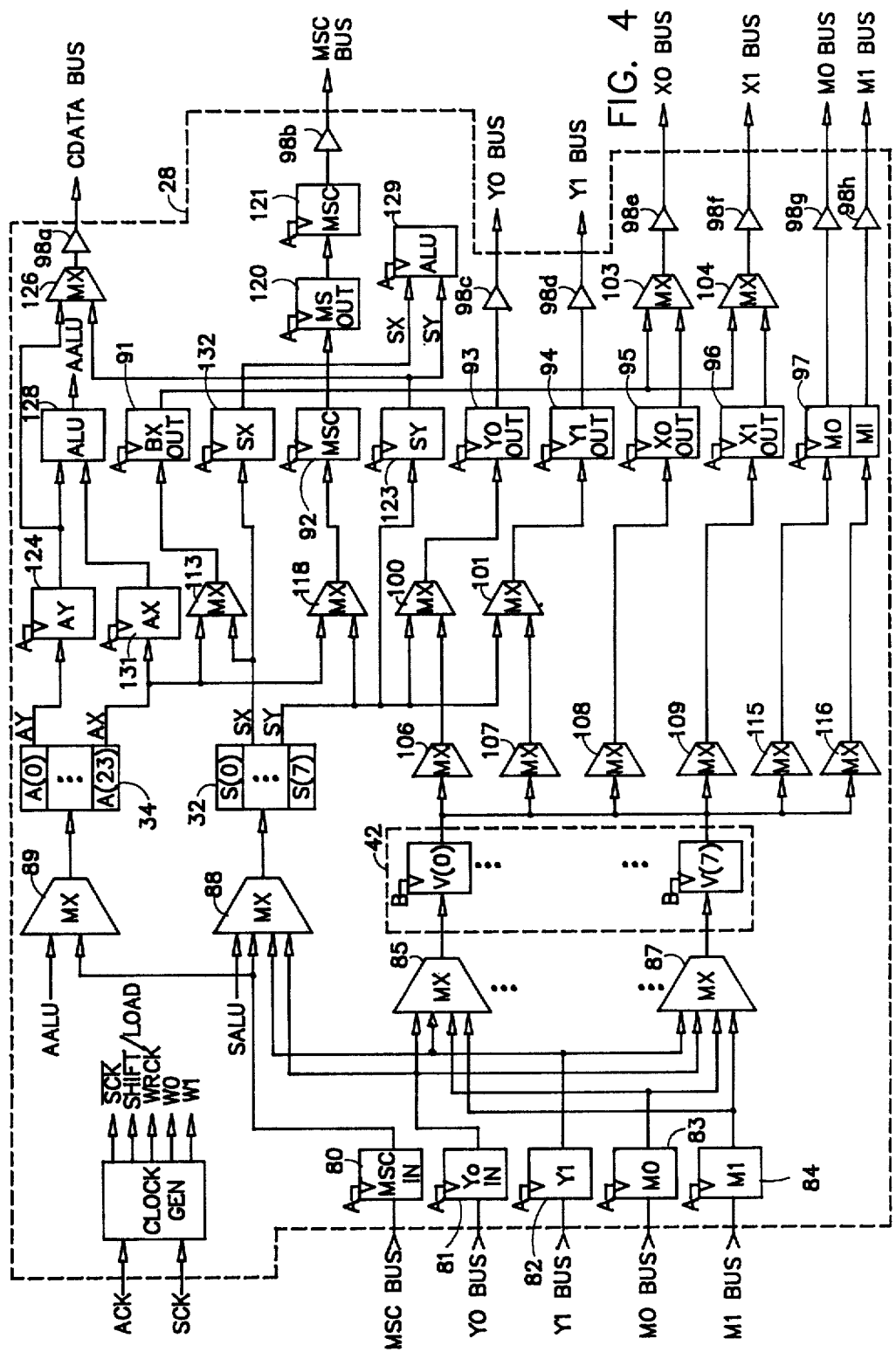
FIG. 4 is a block diagram of the buffer used to stage scalar and vector data objects between the memory and functional unit buses of the invention.

Refer now to FIGS. 2, 3 and 4 for an understanding of the interconnection between the databus system of the invention and the buffer 28. As stated above, the databus system is characterized in having a bus transfer cycle during which data is transferred on one or more of the databuses MSC, M0, M1, X0Y0, X1Y1, Y0, and Y1. As stated, the bus transfer cycle has two phases. A bus transfer cycle corresponds to a cycle of SCK and is bracketed by two successive rising edges of the A clock. The B clock rising edge cleaves the bus transfer cycle into two equal phases. In the preferred embodiment, transfers from the A, S, and V registers to the main memory 8 or to the functional units on the scalar memory, vector memory, and function (MSC, M0, and M1, and X0Y0 and X1Y1, respectively) databuses occur during the data phase of each bus transfer cycle, that is, during the phase corresponding to the first portion of the exemplary cycle between the first A clock pulse and the first B clock pulse. During the data phase of a cycle, the X0Y0 and Y1Y1 buses are termed "operand buses" owing to the transfer of operands to the function units. Transfers to the A, S, and V registers in the buffer 28 on the scalar memory, vector memory, and function bus signal paths take place during the result phase of a bus transfer cycle, that is, during the phase of a bus transfer cycle corresponding to the cycle phase bracketed between the first B clock pulse and the second A clock pulse. During this phase, the Y0 and Y1 signal paths are referred to as "result buses."

In view of this bus transfer cycle pattern, the buffer 28 is designed to stage data objects to the A, S, and V registers from the databus system of the invention by clocking data objects off of the memory and result buses by operation of the registers 80–84 in response to the positive edge of the A clock. This ensures that data transferred to the buffer during the result phase of a bus transfer cycle will be clocked into registers 80–84 at the end of the second phase of each cycle. Routing data objects from the registers 80–84 to a selected the vector register is accomplished by the multiplexers 85–87. The multiplexer 85 is equivalent to eight other multiplexers (one of them the multiplexer 87), each of which feeds a respective one of the eight vector registers 42. These multiplexers are connected to receive inputs from the result and vector memory buses, and select one of the inputs as a source for the associated vector register according to a select control signal received from the VCU 52. The multiplexer 88 receives inputs from the result and scalar memory buses and from the scalar ALU 129, and selects one to be provided to the scalar registers 32 according to a select control signal produced by the RCU 54. The multiplexer 89 selects a data source to be provided to an address register 34 in response to a select control signal received from the RCU 54. The multiplexer 89 selects either the MSC bus or the address ALU 128 as the data source.

Transfer of data objects from the buffer 28 to the memory and operand databuses of the databus system is synchronized with the basic bus transfer cycle by the latches 91–97, each clocked by the positive edge of the A clock. The memory and operand buses are driven from the buffer 28 by di-directional three-state drivers 98b–h, each enabled by the inverse of SCK, denoted below as $\overline{SCK}$.

Scalar data objects are provided for transferring on the X0 and X1 data paths of the two operand buses through the clocked latch 91; vector data objects are provided for the X0 and X1 data paths through the clocked latches 95 and 96. A pair of multiplexers 100 and 101 select either a scalar or vector source for Y0 and Y1, respectively, with the selection determined by a select control signal received from the VCU 52. The multiplexers 103 and 104 select scalar or vector data sources for provision to the X0 and X1 operand signal paths, respectively; the selection state of each of these multiplexers is determined by respective select control signals produced by the VCU 52. A bank of 8-to-1 multiplexers 106–109 each selects a respective one of the eight vector registers 42 as the vector data source for Y0, Y1, X0, and X1, respectively. The selection state of each of the multiplexers 106–109 is determined by a respective select control signal from the VCU 52. Since the superposition of scalar and vector operations can involve the provision of data objects from either the A or S registers as operands for the functional units, a multiplexer 113 is provided to implement the choice. The choice of an S or A register source for the operand buses is made by the SCU 50, which expresses the choice in the form of a select control signal provided to the multiplexer 113.

Vector data read from the V registers 42 is provided to the dual vector memory latch 97 through one or both of the 8-to-1 multiplexers 115 and 116. The V register selected by these multiplexers is determined by respective select control signals from the VCU 52.

A scalar source for supplying the MSC bus through the latch 92 is selected by the multiplexer 118 under the control of the SCU 50. The SCU 50 provides a select control signal which connects either an A or S register to the MSC latch 92. Scalars are staged onto the MSC bus through a two-deep queue consisting of the latches 120 and 121, clocked by the A clock positive edge.

The CDATA bus is also connected to be sourced by registers in the buffer 28. The CDATA bus receives either scalar data through the register 123 or address selects one of the V registers 42 as a data source for an operand bus denoted by xx. The signals WR0SEL, WR1SEL, WR0ASEL, and WR1ASEL are explained here simply as select control signals that choose a data source for the S and A registers; further explanation will be provided below of the write slots W0 and W1.

TABLE I

| | BUFFER MULTIPLEX SELECT CONTROL SIGNALS | | |
|---|---|---|---|
| MULTIPLEXER | MNEMONIC | SOURCE | FUNCTION |
| 85, 87 | VxWRSEL | VCU 52 | SELECTS A VECTOR MEMORY OR RESULT DATABUS AS A DATA SOURCE FOR VECTOR REGISTER V(x) |
| 106–109 | VxxSEL | VCU 52 | SELECTS A VECTOR REGISTER AS DATA SOURCE FOR OPERAND BUS xx = Y0, Y1, X0, or X1 |
| 100–104 | xxBSEL | VCU 52 | SELECTS A VECTOR OR SCALAR REGISTER AS A DATA SOURCE FOR OPERAND BUS xx = Y0, Y1, X0, or X1 |
| 115, 116 | VMxSEL | VCU 52 | SELECTS A VECTOR REGISTER AS DATA SOURCE FOR MEMORY BUS Mx = M0 OR M1 |
| 88 | WR0SEL (WR1SEL) | RCU 54 | WR0SEL (WR1SEL) SELECTS SCALAR MEMORY OR RESULT DATABUS AS A DATA SOURCE FOR A SCALAR REGISTER DURING THE W0 (W1) WRITE SLOT OF A TRANSFER CYCLE |
| 89 | WR0ASEL (WR1ASEL) | RCU 54 | WR0ASEL (WR1ASEL) SELECTS THE SCALAR MEMORY BUS OR ANOTHER DATA SOURCE FOR AN ADDRESS REGISTER DURING THE W0 (W1) WRITE SLOT OF A TRANSFER CYCLE |
| 118 | MSCQSEL | SCU 50 | SELECTS AN ADDRESS OR SCALAR REGISTER AS DATA SOURCE FOR MEMORY BUS MSC |
| 113 | ASXSEL | SCU 50 | SELECTS AN ADDRESS OR SCALAR REGISTER AS DATA SOURCE FOR OPERAND BUSES X0, X1 |
| 126 | CDATABSEL | SCU 50 | SELECTS AN ADDRESS OR SCALAR REGISTER AS DATA SOURCE FOR C DATABUS | data through the register 124. The CDATA bus source selection is made by a 2-to-1 multiplexer 126, whose input selection is determined by a select control signal provided by the SCU 50. The CDATA bus is driven by the bi-directional three-state driver 98a, also enabled by the $\overline{SCK}$.

To complete the description of the buffer 28 for the purposes of understanding the invention, address and scalar arithmetic and logic units (ALU) 128 and 129 are located in the buffer 28. The ALU's 128 and 129 perform conventional processing functions on address and scalar operands. Their results are provided to the multiplexers 89 and 88, respectively. A latch 131 corresponding to the latch 124 is provided to synchronize the provision of a pair of address operands to the address ALU 128. Another scalar latch 132 is provided to operate synchronously with the latch 123 for the purpose of synchronizing the provision of scalar operands to the scalar ALU 129. Finally, a clock generator 130 generates the variety of shift clocks necessary for synchronizing buffer operation to the operations of the rest of the computer.

Consult Table I for a complete mnemonic listing of the select control signals that operate the multiplexers in the buffer 28 of FIG. 4. For example, each of the multiplexers 106–109 is controlled by a signal VxxSEL that is provided by the VCU 52. The VxxSEL signal The S and A registers 32 and 34, respectively, are implemented using multi-port random access memory (RAM) technology. The S register arrangement is illustrated in FIG. 5A and corresponds in essential details to the structure of the A registers 34. The S registers 32 comprise a multi-port RAM having a pair of read ports, QB and QC, which provide SY and SX outputs, respectively. The ports ADDRB and REB permit the S register defined by the address input to port ADDRB to be read through the read port QB when the enable signal at the enable port REB is activated. The same, or another, S register can be read from the QC port when register address and read enable signals are provided through the ADDRC and RAC ports, respectively. S register address and read enable signals are obtained from the SCU 50 and are registered into the buffer 28 through the register 133 that is clocked by the B clock. The SYRDEN and SXRDEN signals from the SCU correspond to the B and C read enable signals, while the SYRD and SXRD control signals correspond to the B and C address signals.

Two write operations can be conducted on the S registers 32 during any single bus transfer cycle. Writing the S registers can be understood with reference to FIG. 5B where a single bus transfer cycle is defined between successive positive edges of the A clock. First and second write slot signals, W0 and W1, are provided from the clock generator 130 during the data and result phases, respectively, of each bus transfer cycle. W0 and W1 are gated to the S registers by circuitry comprising registers 137 and 138, AND gates 139 and 140, and OR gate 141. If data is to be written to an S register during the first phase of a bus transfer cycle, a control signal WR0SEN provided from the RCU 54 on the preceding cycle is clocked in by the B phase clock in register 137. This permits the gate 139 to gate W0 through the gate 141 whence it is provided to the clock (CLK) input of the RAM. A corresponding sequence of gates routes W1 to the CLK port during the second phase of a bus transfer cycle when the WR1SEN signal is provided on the previous cycle.

The S register RAM operates conventionally to cause data present at the D port of the RAM to be written to the S register identified by the signal input at the ADRA port when a write slot signal is gated to the CLK port. The receiving register S(i) is designated by one of two S register control signals, WR1S(i) or WR0S(i). Selection of the scalar memory or one of the result buses (performed by the multiplexer 88 as described above) is defined by either WR1SEL or WR0SEL, both provided by the RCU 54. The S register write control signals just identified are produced by the RCU 54 in the cycle preceding the cycle during which the S registers are written by the LOAD state of a shift/load signal from the clock generator 130 that strobes the signals into a multiplexing latch 142. The latch is clocked by WRCK, which is obtained by combining ACK and W0. The latched control signals are provided to the S registers in correct phase with the W0 and W1 signals to accomplish data entry into the selected S register(s) from the selected databus source (S) during each bus transfer cycle.

Figures 6A, 6B:
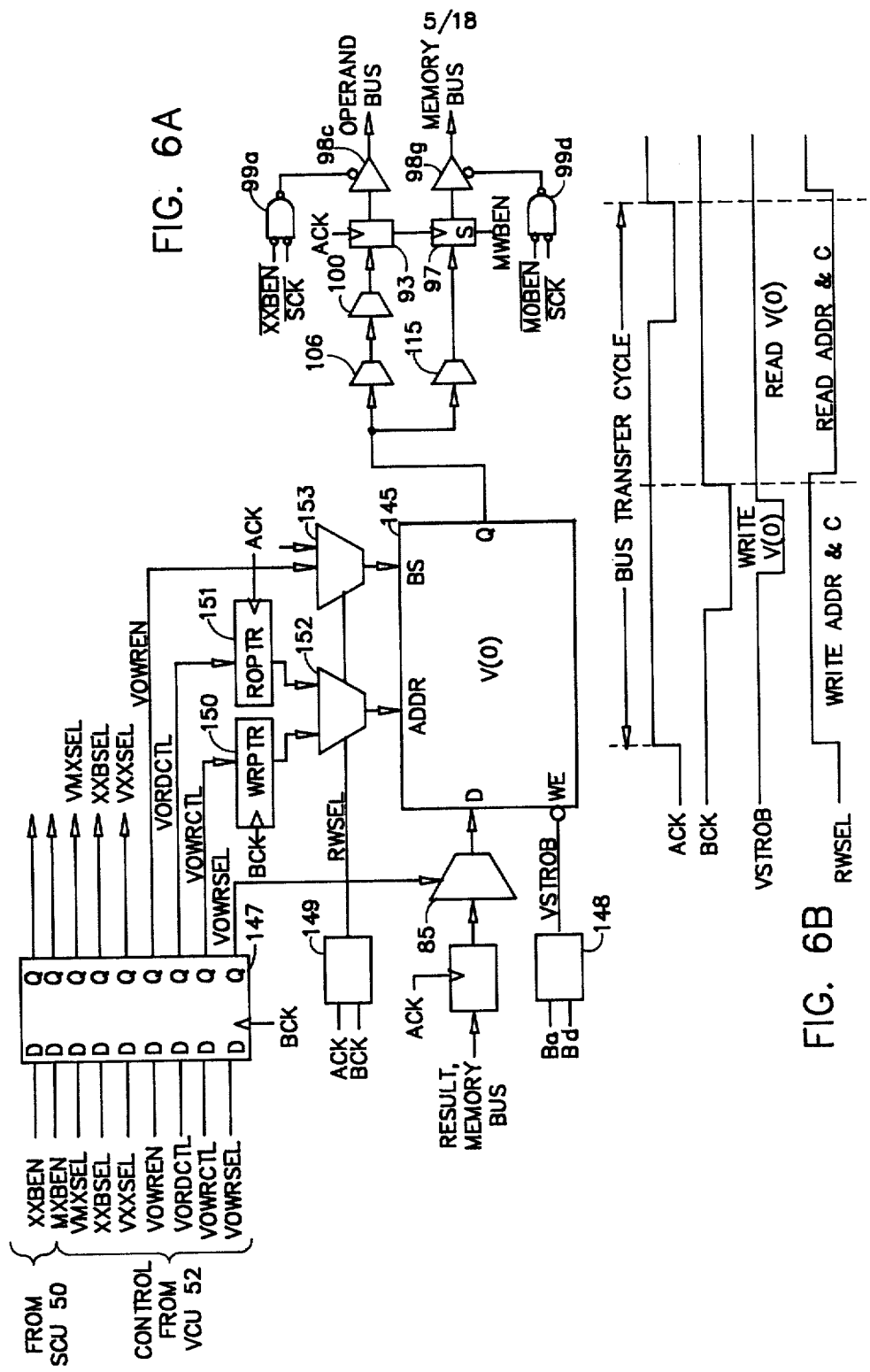
FIG. 6A is a block diagram showing structure and control of a vector (V) register.
FIG. 6B is a timing diagram illustrating operation of the V register.

Operation of the V registers 42 and driving a bus during a transfer cycle data phase can be understood with reference to FIGS. 6A and 6B. FIGS. 6A and 6B illustrate the structure and operation of register V(0). In the preferred embodiment, the V registers comprise high-speed RAM's that are written to at a RAM address upon the coincidence of a write enable (WE) signal pulse and one of two levels of binary select (S) signals. The RAM is read from at an address indicated by the signal input to the ADDR port when the WE signal is inactive and the S signal has assumed the second of its two states. The signal at the ADDR port uniquely identifies one of the elements in a vector stored in the register V(0).

Data is written to the register 145 from a databus source selected by the multiplexer 85, described above.

Data read from the V(0) register is routed to one of the operand or vector memory databuses through one of the multiplexers 106–109, 115, or 116. Only the multiplexers 106 and 115 are illustrated in FIG. 6A, however, it is to be understood that the output of the V(0) register is connected also to the multiplexers 107, 108, 109, and 116. Further, the multiplexer 100, described above, is also included in FIG. 5A. Data routing and accessing associated with writing and reading the register V(0) are determined by a set of control signals provided from the VCU 52. The VCU control signals of FIG. 6A are illustrative of a larger family of control signals that are provided to all V registers and all associated multiplexers that are accessed during a bus transfer cycle.

As shown in FIG. 6B, a V register may be written and read during each cycle, with the writing occurring in the cycle data phase and the reading during the result phase. Writing is enabled by a VSTROB signal which pulses to a write condition during a B clock pulse. The VSTROB signal is developed from a conventional logic circuit 148 that combines an advanced B phase clock ($B_a$) and a delayed B phase clock ($B_d$). The write address and select signals for the write operation are gated through a pair of multiplexers 152 and 153 by a read/write select (RWSEL) signal developed by a logic circuit 149 from the B and A phase clocks. The write address is obtained from a write pointer (WRPTR) 150 whose operation is controlled by a four-state VCO control signal labeled VOWRCTL. The VOWRCTL signal assumes a hold, a load, or an increment state. In the load state, the write pointer 150 is either initialized to 0, or loaded from an address register on a data path which is not shown to an initial address. When the VOWRCTL signal is in the increment state, the count in the pointer increments on the B phase clock. During the hold state of the VOWRCTL, the current count is held. Thus, the write pointer can be operated to point to any selected element of a vector data object in the V(0) register and to incrementally advance its pointing from one element to another. The write operation also requires the provision by the VCU 52 of the write enable signal VOWREN. At the same time that the write control signals are provided to the V(0) register, a write source select signal VOWRSEL operates the multiplexer 85 to select a databus as the data source for the write operation.

The read operation on the V(0) register 145 is conducted during the result half of a bus transfer cycle when the RWSEL signal changes state, causing the multiplexer 152 to connect the output of a read pointer 151 to the address port of the register, and causes the multiplexer 153 to remove the VOWREN signal from the S port. During the result phase of a cycle, the current count of the read pointer 161 signifies the element of the vector in the V(0) register to be read to one of the databuses. In the example of FIG. 6A, the element read from the register 145 is routed to the Y0 bus by provision of appropriate VCU select control signals to the multiplexers 106 and 100. The read pointer 151 is operated by a VCU-supplied control signal V0 RDCTL that defines hold, load, and increment conditions. These conditions operate the read pointer 151 in essentially the same manner as corresponding conditions operate the write pointer 150.

FIG. 6A illustrates how an operand bus signal path and memory bus are driven from the buffer 28. The figure illustrates only driving of operand bus signal path Y0 and memory bus M0; however, it is understood that these are representative of the other operand signal paths X0, X1, and Y1 and of the memory bus M1. Data is brought to operand path Y0 through the multiplexer 100 and strobed into latch 93. If data is actually present at the input to latch 93, a qualifying signal $\overline{\text{Y0BEN}}$ (expressed generally as $\overline{\text{xxBEN}}$) permits the gate 99a to enable the three-state driver 98c to drive the data to the Y0 operand path with the negative edge of $\overline{\text{SCK}}$. The negative edge of $\overline{\text{SCK}}$ corresponds to a positive SCK edge which, as FIG. 2 shows, defines the data phase of a transfer cycle. The drivers 98d-f are similarly controlled.

The memory bus is driven during the data phase of a transfer cycle if the $\overline{\text{M0BEN}}$ (generalized as MxBEN) signal gate $\overline{\text{SCK}}$ to the latch 98g. It is noted that data is queued to the memory bus by provision of a strobe enable signal MWBEN to the M0 portion of latch 97. If the MWBEN is asserted, data is strobed through the latch each ACK; otherwise, data is held in the latch.

MEMORY CONTROL UNIT

Figure 7:
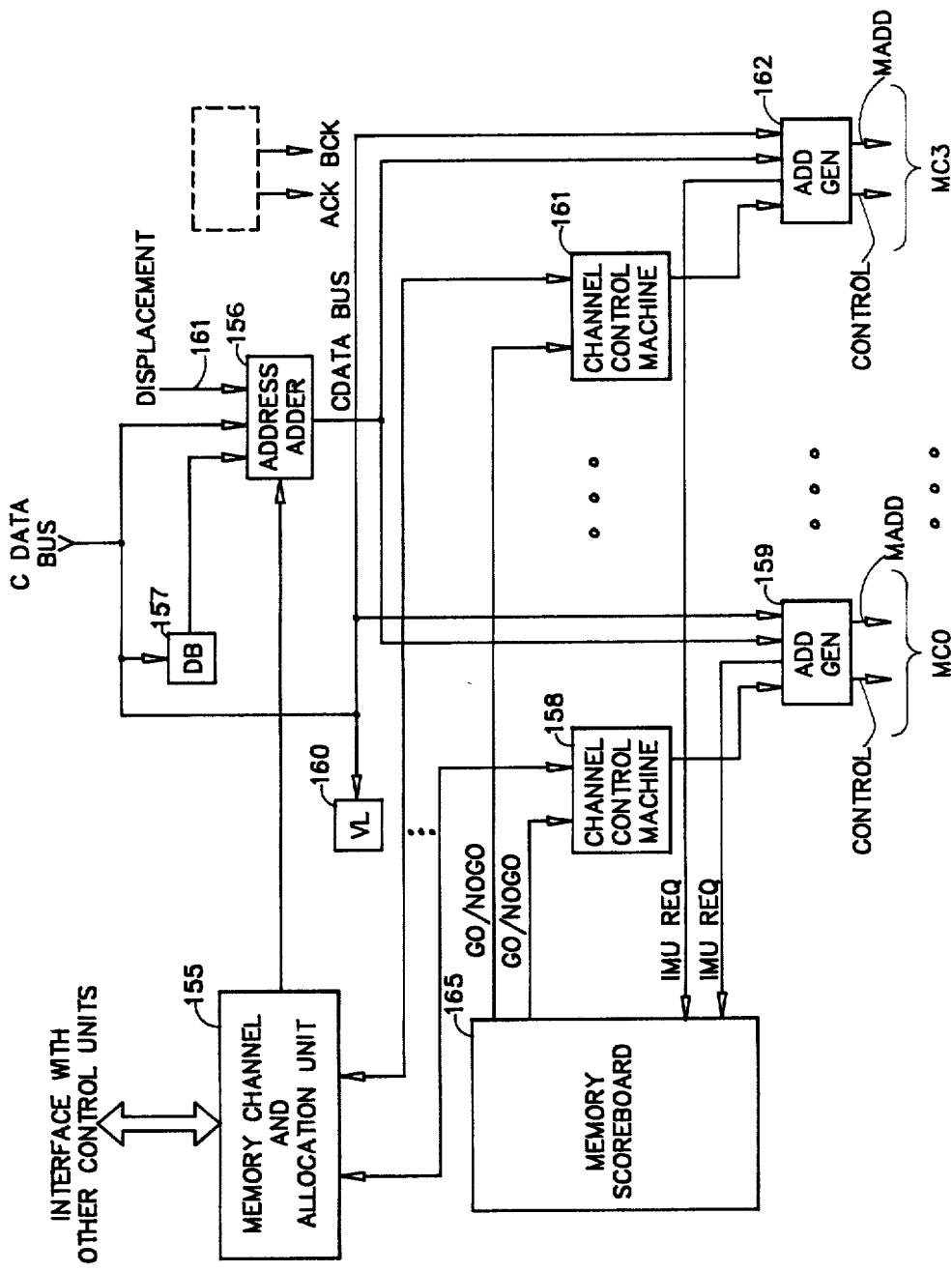
FIG. 7 is a block diagram of a memory control unit.

The block diagram of FIG. 7 illustrates the major components of the memory control unit (MCU) 46. A memory channel and bus allocator unit (MCAU) 155 comprises logic responsive to memory commands obtained by decoding memory reference instructions. Such instructions include, but are not necessarily limited to, instructions for transferring scalar data objects between the main memory and the buffer 28 on MSC and instructions for transferring vector data objects between the main memory and the buffer on an available vector memory databus. Instructions having corresponding functions can be found in the instruction manual for the Cray-XMP computer available from Cray Research, Inc., Chippewa Falls, Wis. However, for an understanding of the operations of the MCU which affect transfer on the scalar and vector memory databuses, exemplary instructions are summarized.

Scalar memory reference instructions have the general form:

OP, h, i, Displacement

The first field includes an operation code (OP code, OP), the second field the identification of an address register A(h), the third field the identification of another address register A(i), and the fourth field a displacement value. The OP code indicates whether the instruction is a scalar memory read (SCMRD) or a scalar memory write (SCMWR) instruction. The SCMRD instruction reads a scalar from memory for transfer on the MSC bus to the buffer 28; the SCMWR instruction indicates transfer of a scalar from the buffer to the main memory on the MSC bus. The address of the memory location at which the scalar memory reference is to occur is calculated as the sum of the contents of A(h), the value in the displacement field, and a base address. The third field of the instruction indicates the scalar register S(i) involved in execution of the instruction.

Vector memory reference instructions take place on one of the two memory databuses, M0 or M1. The representative vector memory reference instructions are referred to as a vector memory read (VCMRD) or a vector memory write (VCMWR) instruction and are summarized as:

OP, i, 0, k VECMRD

OP, 0, j, k VECMWR

The VCMRD instruction retrieves vector elements from a succession of main memory storage locations. The address of the first element is calculated using the contents of register A(0). The value by which the current memory address is incremented to provide the storage location of the next element of the vector being transferred is in the register A(k). The vector register to which the succession of vector elements which compound the vector being read from memory is transferred is denoted as V(i). In the VCMWR instruction the op code indicates that the vector data object is to be transferred from the register V(j) to a succession of main memory locations beginning with an address based on the contents of the register A(0) and incrementing by the value in the register A(k).

Memory reference instructions are decoded to produce a control word (CWRD) including control signals that are distributed to the control units contributing to instruction execution. Thus, for the SCMRD and SCMWR instructions, portions of the control word are provided to the control units 46, 50, and 54. The vector memory reference instructions result in portions of control words being provided to the control units 46, 50, 52, and 54.

A portion of a CWRD is provided to the MCAU 155. The unit is connected to control entry of information into an address adder 156, a database address register 157, and a vector length register 160. The registers 157 and 160 are loaded independently from the CDATA bus at appropriate points in program execution from registers in the buffer 28. The contents of the register 158 constitute a conventional database value used in memory address calculation. The contents of the register 160 indicate the length of all vectors involved in current machine operations. The address adder 156 operates conventionally to combine the contents of the register 158 with information received from the CDATA bus and the value in the displacement field of a scalar memory reference instruction. This latter value is provided on signal line 161 which is connected to the instruction register in which the displacement field is held The MCAU 155 provides a binary control signal SC/VEC indicating whether the current instruction is a scalar or vector memory reference.

If the current instruction is a scalar memory reference, the CDATA bus will conduct the contents of register A(h) to the adder 156, which the adder 156 will combine with the database value and the displacement value.

If the current instruction is a vector memory reference instruction, the adder 156 adds only the value in the register 158 and a value on the CDATA bus. During a vector memory reference instruction, the CDATA bus conducts first the contents of the A(0) register, which the adder 156 receives and adds to the base address. Next, the contents of A(k), the memory reference increment value, are placed on the CDATA bus.

The adder 156 performs the addition indicated by the control signal from the unit 155 once each bus transfer cycle.

The MCU 46 also includes four memory channel couplers, each including a channel control machine (CCM) and an address generator. Each coupler provides the memory access and memory address signals on a respective one of the memory control and address buses MC0-MC3. Three of these couplers are essentially equivalent, and each has the responsibility of executing the memory access process during execution of a respective vector memory reference instruction. Only one of these vector memory couplers is illustrated in FIG. 7; it comprises the channel control machine 158 and the address generator 159; the coupler is shown providing the memory access control (CONTROL) and memory access addresses (MADD) for the control and address bus MC0. The fourth memory coupler provides the memory access control and address signals for each scalar memory reference. The scalar coupler comprises the CCM 161 and the address generator 162, and is shown driving the control and address bus MC3.

Finally, the memory control unit 46 includes a memory scoreboard circuit 165 which serializes memory coupler access to the main memory by keeping track of currently-accessed main memory locations and scheduling requests for access.

Figure 8:
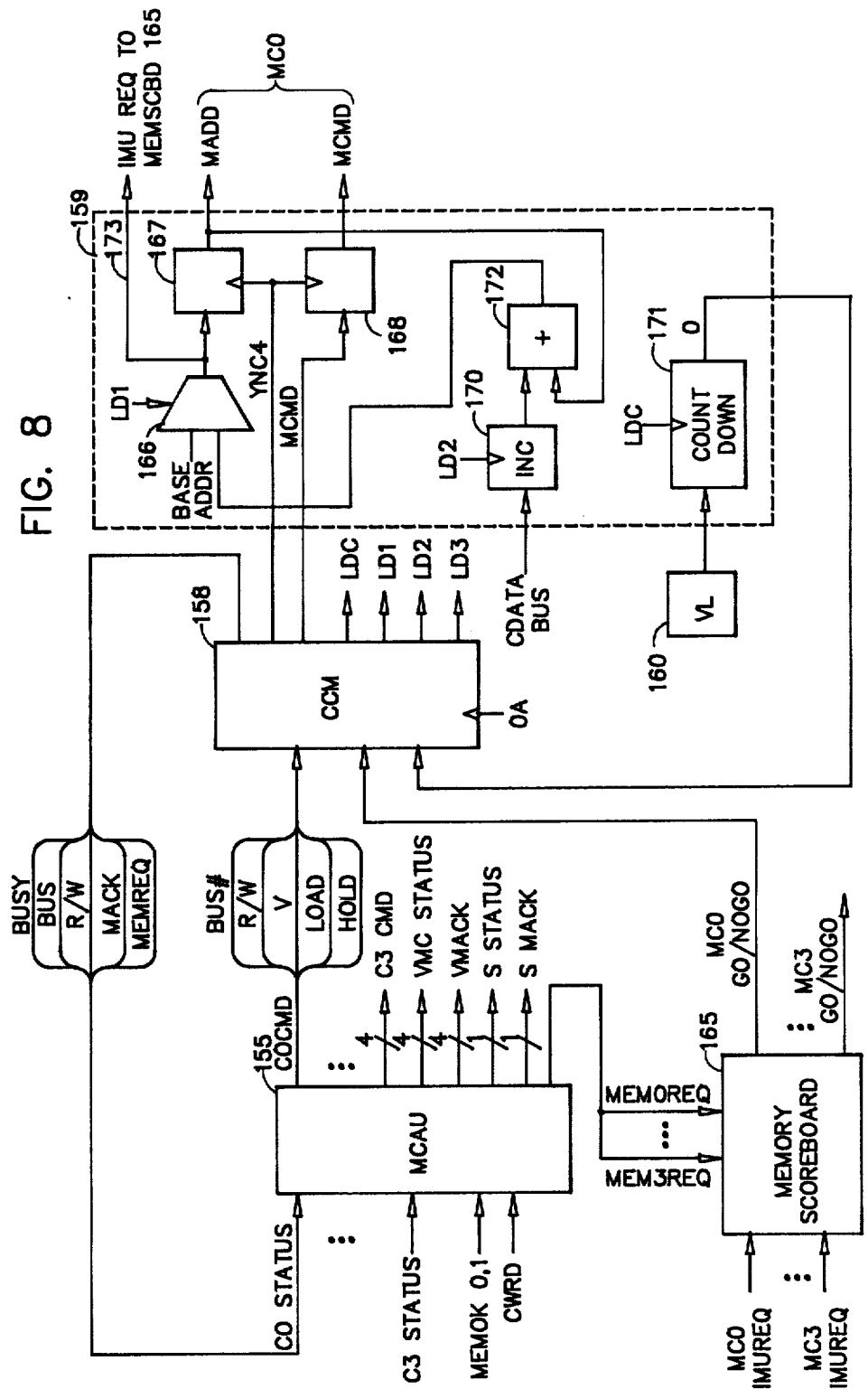
FIG. 8 is a more detailed block diagram of a memory coupler included in the memory control unit of FIG. 7.

The operations of the vector coupler including the CCM 158 and the address generator 159 can be understood with reference to FIG. 8. The vector coupler is controlled by the MCAU 155, which is a multi-state machine that operates in response to the status of the four couplers, a pair of handshaking signals, MEMOK0 and MEMOK1, which indicate the presence of a vector element on M0 and M1, respectively, and a portion of a vector memory control word (CWRD) produced by the control decoders when a memory instruction is in the instruction registers.

When a vector memory CWRD is detected, the MCAU 155 determines the combination of bus and coupler which will process execution of the instruction. In the preferred embodiment, the existence of the two buses M0 and M1 and the provision of two phases per bus transfer cycle effectively permit two vector transfers to memory (VCMWR) and two vector transfers from memory (VCMRD) each bus cycle. Since there are only three vector memory couplers, only three memory references can be performed during any one bus cycle: two writes and one read or two reads and one write. Thus, when a vector memory CWRD is detected, issuance of the instruction will be held up if the three couplers are all ready allocated for execution of previous instructions, or if the necessary M0 and M1 bus read (write) cycle phases are both occupied and the instructions is a VCMRD (VCMWR).

The MCAU 155 continually monitors the status of each of the memory couplers to determine their activity. The compound status signal for the memory coupler comprising the CCM 158 and the address generator 159 is indicated as the C0STATUS signal line, which is differentiated to illustrate the functions of its individual signal paths. It is to be understood that the C0STATUS signals correspond essentially to the status signals for the other three channel control combinations.

The C0STATUS line has six binary signal paths denoted as BUSY, BUS, R/W, MACK, and MEMREQ. The BUSY signal line indicates whether or not the CCM 158 is occupied in instruction execution. The BUS signal indicates which of the vector memory databuses the CCM 158 is currently conducting a memory reference process on. R/W signal line indicates whether the CCM 158 is engaged in a read or write execution process. The MACK signal is provided by the CCM 158 each time a vector element is placed onto a vector memory bus during a VCMRD execution, or each time the coupler produces a set of control and address signals for reading a vector element into the main memory from a bus during a VCMWR instruction sequence process. The MEMREQ signal is a request by the coupler for access to a main memory location; this signal is qualified by the MEMOK0 or MEMOK1 signals from the VCU if the coupler is engaged in a VCMWR execution. For example, if the coupler is engaged in a VCMWR on M0, its MEMREQ signal will be forwarded to the memory scoreboard 165 only when the MCAU receives the MEMOK0 from VCU.

The MCAU provides a manifold VCM (vector memory coupler) STATUS signal compounding four respective binary lines: VECRDBUS, VECWRBUS, VERDOK, and VECWROK, VECRDBUS indicates which bus a vector read from memory should use; VECWRBUS indicates which bus a vector write to memory should use; VERDOK indicates that a vector read of the main memory may proceed; VECWROK indicates that a vector write to the main memory may proceed. These signals are all provided to the VCU 52.

The MCAU provides four vector memory access acknowledgment signals (VMACK) that correspond to the MACK signals received from the CCMs. These signals are: MACK0WT and MACK1WT, acknowledgments of receipt of a vector element transferred on M0 or M1, respectively, during a VCMWR instruction; and MACK0RD and MACK1RD, acknowledgments of placement of memory elements on M0 or M1, respectively, during a VCMRD instruction execution.

Scalar memory controller and MSC bus transfer acknowledgment signals (SSTATUS and SMACK) are provided to indicate the status of the scalar coupler and acknowledge coupler production of scalar memory control and address signals.

The MCAU 155 also provides a compound command signal to each memory coupler. A coupler command signal is provided to a CCM not busy when a memory reference instruction issues and a memory bus is available. When the memory reference involves a vector, a command is sent to one of the vector CCM's. For a scalar memory instruction, the command is issued to the CCM 161. If a memory coupler or memory bus is not available when a memory reference instruction is poised for issuance, the VMC STATUS or SMC STATUS signals will indicate this lack of availability and issuance of the instruction will be held up by another control unit in response to the proper status signal.

Assuming a vector memory reference instruction is in the instruction registers, and postulating further that a memory bus and the control combination including the CCM 158 and address generator 159 are available, the MCAU 155 will provide a command C0CMD to the CCM 158. The C0CMD includes assignment of a vector memory databus that is not busy performing the type of memory reference currently required (BUS), indication of whether the reference is a read or a write (R/W), signification that the operation is a vector (V) memory reference, a LOAD signal phased with the provision of A(k) register contents on the CDATA bus to load the increment value into the address generator 159, and a HOLD signal indicating that one of the other control units has activated its HI signal.

The CCM 158 is a conventionally-implemented multi-state machine that executes a vector memory reference state sequence in response to a C0CMD from the MCAU 155. When the CCM 158 is idle, the C0CMD signal will place it in a start state. In the start state, the CCM 158 provides a load signal to the generator 159 and causes the multiplexer 166 to select the base address calculated by the adder 156 for entry into a register 167. The start address is the main memory location where the first vector element is to be read or written. At the same time, the CCM produces an appropriate memory command signal that is entered into the register 168 and constitutes a memory command that indicates to the main memory the vector memory databus upon which data transfer is to take place and whether the transfer is a read or a write. After transfer of the first address, the increment from the A(k) register is loaded to the register 170 off of the CDATA bus and the vector length is loaded to conventional countdown circuitry 171. The countdown circuitry 171 counts down the vector length each time memory address and command information is dispatched on control bus MC0 until the zero count is reached. When the zero count is reached, the CCM 158 returns to the idle state and awaits its next assignment.

During a vector memory reference operation, the increment value in the register 170 is added in the add circuit 172 to the last address calculated to produce the next main memory address. The next address is fed through the multiplexer 166 to the register 167 where it is aligned with the next memory command in the register 168.

The main memory address and memory command are held in the registers 167 and 168 each time a new address is calculated until the CCM receives an indication from the memory scoreboard 165 that there is no process competing for the location. This is indicated by the GO state of a GO/NOGO signal received from the scoreboard 165. The scoreboard is provided with the portion of the memory address calculated for the next memory reference that identifies the IMU of main memory where the reference is to take place. The scoreboard pulse receives, via the MCAU, the MEMREQ signal produced by the coupler each time a new address is calculated by the generator 159. The MEMREQ will be automatically forwarded by the MCAU when a VECMRD is in progress; however, it will be forwarded during a VECMWRT only when a MEMOK is received which refers to the memory bus that the coupler is receiving vector elements on.

The memory scoreboard 165 operates to serialize, access of the memory controllers to memory resources. In this regard, it maintains records of all memory IMU's that are currently being accessed by memory couplers. When a memory coupler has calculated the next memory location, it transmits its next memory address (IMU REQ) to the memory scoreboard. If the MEMREQ for the coupler has not been received, the scoreboard ignores the IMU/REQ. Otherwise, the request is serialized. If the requested IMU is busy, or if a concurrent request for the same IMU is received from a memory coupler having a higher priority, the memory scoreboard 165 will place the GO/NOGO signal for the requesting memory coupler in the NOGO state. The NOGO state will cause the CCM to suspend its operation until the requested memory resource becomes available, which will be indicated by the GO state of the memory coupler's GO/NOGO signal. When a coupler is held by a NOGO indication from the memory scoreboard 165, it will continuously assert its MEM and IMU requests to the scoreboard until it receives a GO indication.

Scalar memory reference operations are controlled exclusively by the coupler including the CCM 161 and the generator 162. It should be evident that the combination functions by effectively treating each scalar memory reference as a vector memory reference concerning a vector including only a single element. The address generation capability in this control combination is provided to handle block transfers of scalar data objects. In the preferred embodiment, the scalar memory coupler has a two-deep queue for scalar memory reference instructions. Thus, it can accept responsibility for executing a scalar memory reference while still engaged in executing a previous one.

When a memory coupler provides a memory command and address combination to the main memory, it provides a MACK signal to the MCAU to acknowledge the initiation of a memory reference. The acknowledgment signals received from the couplers are processed by the MCAU 155 to produce the VMACK and SMACK signals that indicate initiation of the memory reference operation on an identified bus.

VECTOR CONTROL UNIT

Figure 9:
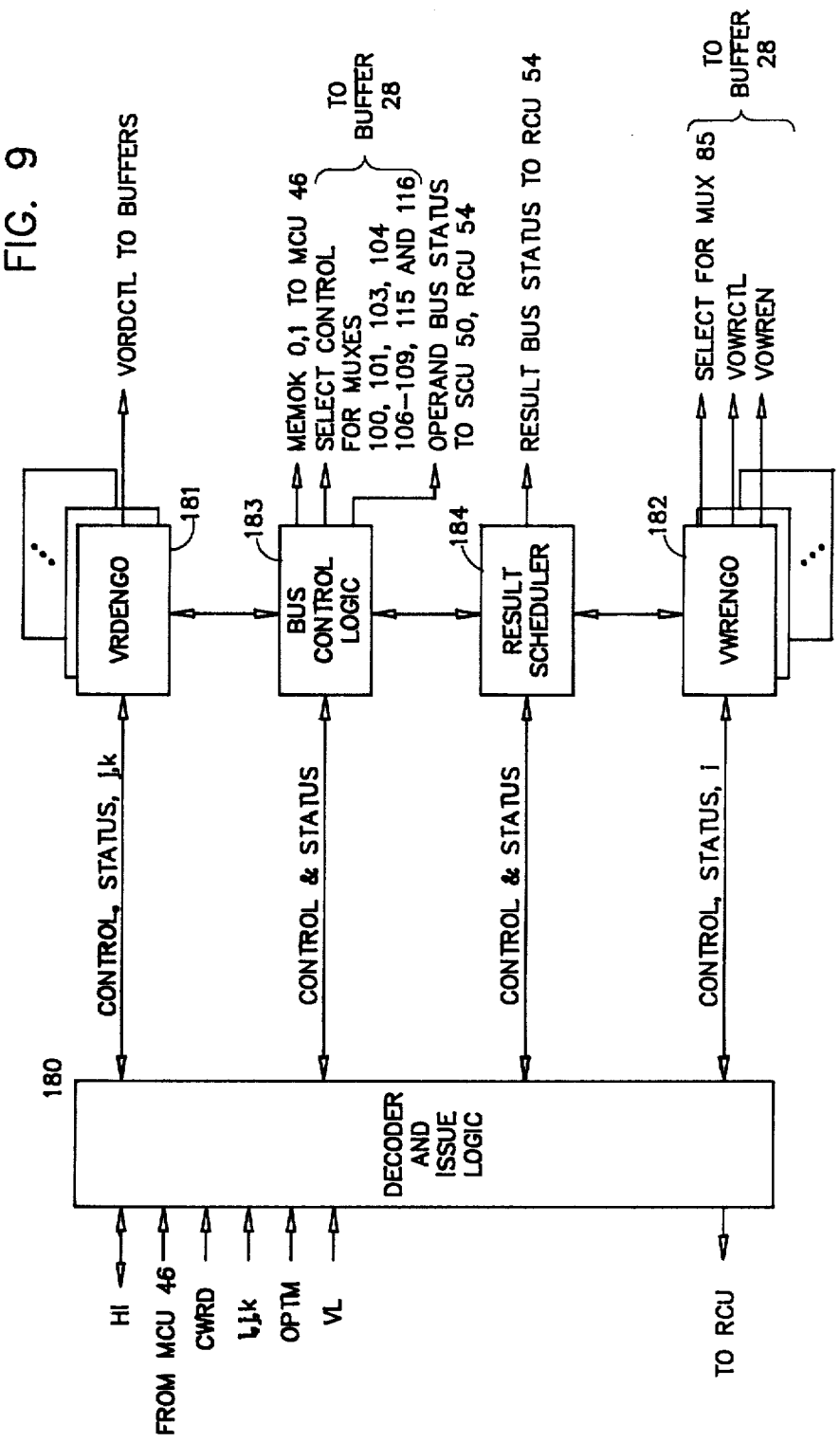
FIG. 9 is a block diagram of the vector controller which controls transfer of vector data objects on the memory and functional unit databuses of the invention.

The vector control unit 52 is illustrated generally in FIG. 9 and in detail in FIGS. 10A-15. Refer now to FIG. 9. The VCU 52 includes five major blocks: decoder and issue logic 180, eight identical vector read engines (VRDENG), one indicated by 181, eight identical vector write engines (VWRENG), one denoted by the reference numeral 182, bus control logic 183, and result scheduler logic 184.

The decoder and issue logic 180 constitutes the primary VCU interface receiving instruction execution information including a portion of the CWRD, as well as the i, j, and k fields of the current vector instruction. Conventional vector instruction format, understandable with reference to the Cray publication cited above, has a plurality of consecutive fields, the first of which contains the code of the instruction, together with three following fields, designated i, j, and k fields. In a vector instruction involving a functional unit, the j and k fields indicate the V registers providing operands; the i field denotes the V register receiving the result. The VCMRD and VCMWR instructions are discussed above.

In the preferred embodiment, during execution of a vector functional instruction: the V(j) contents are transferred on the X0 or X1 operand signal paths, while the V(k) contents are transferred on the Y0 or Y1 operand signal paths. It should be noted that a vector operation can involve a functional unit combination of a vector and scalar data object. In this case, the scalar operand is transferred on one of the X operand paths, while the contents of the V(k) register are transferred on the corresponding one of the Y operand paths.

A vector instruction CWRD indicates to the logic 180 what resources are required for execution of the instruction. The indications include, but are not limited to, separate i, j, and k indications that the instruction involves a V register denoted by the corresponding instruction field, MWT or MRD indications, denoting VCMWR, VCMRD instructions, respectively, and ENX (enable operand x) and ENY (enable operand y) indications, denoting required use of one or both of the signal paths of an operand bus. From the RCU 54, the VCU receives a functional unit time signal (OPTM) corresponding to the number of transfer cycles required by a functional unit to provide a result in response to a pair of operands. Finally, the VCU 52 receives a copy of the vector length (VL) from the SCU 50.

The decoder and issue logic 180 responds to the CWRD, to the i, j, and k fields of the current instruction, and to the memory resource status signals from MCU 46 to determine whether a current vector instruction requiring use of a databus should issue. The issue logic will hold issue if a V register to be read is already being read or if a V register to be written to is either already receiving data or being read. The logic 180 will also hold issue of vector memory reference instructions, when the state of the required memory resource status signal (VECRDOK or VECWROK) indicates that the required memory resources are unavailable. Only if any of these conditions are met, will the issue logic 180 activate the VCU's HI signal to suspend issue until the required resources are available.

In response to a vector instruction involving use of the databuses, the logic 180 will consult the status of the resources required for execution of the instruction and provide control signals to reserve the required resources when the resources are available. The resources include one or more vector read engines. Each vector read engine is assigned to control the reading of vector elements from a specific V register. The read engine for register V(0) is indicated by reference numeral 181 and the mnemonic VRDENGO. Thus, if V(0) is indicated in either the j or k field of the current instruction, VRDENGO 181 will be required to provide the set of V(0) RDCTL signals to the buffer 28 that transfer a vector from the register V(0) to a databus.

A set of eight vector write engines exchange control and status signals with the logic 180 whenever a vector instruction requires writing a vector into the V register indicated by the instruction i field. In FIG. 9, the write engine for register V(0) is indicated by reference numeral 182 and the mnemonic VWRENGO. Each vector write engine provides the select signals for its associated source databus multiplexer, the write control signals for controlling the V register write pointer, and a write enable signal. Thus, the VWRENGO 182 is shown producing the select signal VOWRSEL for the multiplexer 85, together with the write control and write enable signals for the V(0) register.

The bus control logic 183 monitors the availability of and allocates available operand, result and memory buses to read and write engines for transfer of vectors to and from the V registers. When vectors are read from the V registers, the logic 183 provides select control signals to the multiplexers 100, 101, 103, 104, 106–109, 115, and 116, located in the buffer 28. Bus status signals are provided to the SCU 50 and RCU 54 to permit scheduling of scalar or address instructions requiring use of an operand or result bus. Finally, the logic 183 produces the MEMOK0, and MEMOK1 signals provided to the MCU 46.

The result scheduler 184 synchronizes the operations of one or more vector read engines and a vector write engine during the execution of each vector instruction involving a functional unit; these operations are synchronized in order to ensure proper phasing of vector element transfer on the operand and result buses. In this regard, the scheduler coordinates operations of the read engines of the registers V(j) and V(k) to ensure that corresponding operand elements are provided concurrently on the X and Y data paths, respectively, of an operand bus. Further, it is ensured that the elements of the result vector are transferred from the functional unit to the specified result bus as they become available by taking into account the delay or processing time through the functional unit and any interruptions in provision of the operands.

Figure 10:
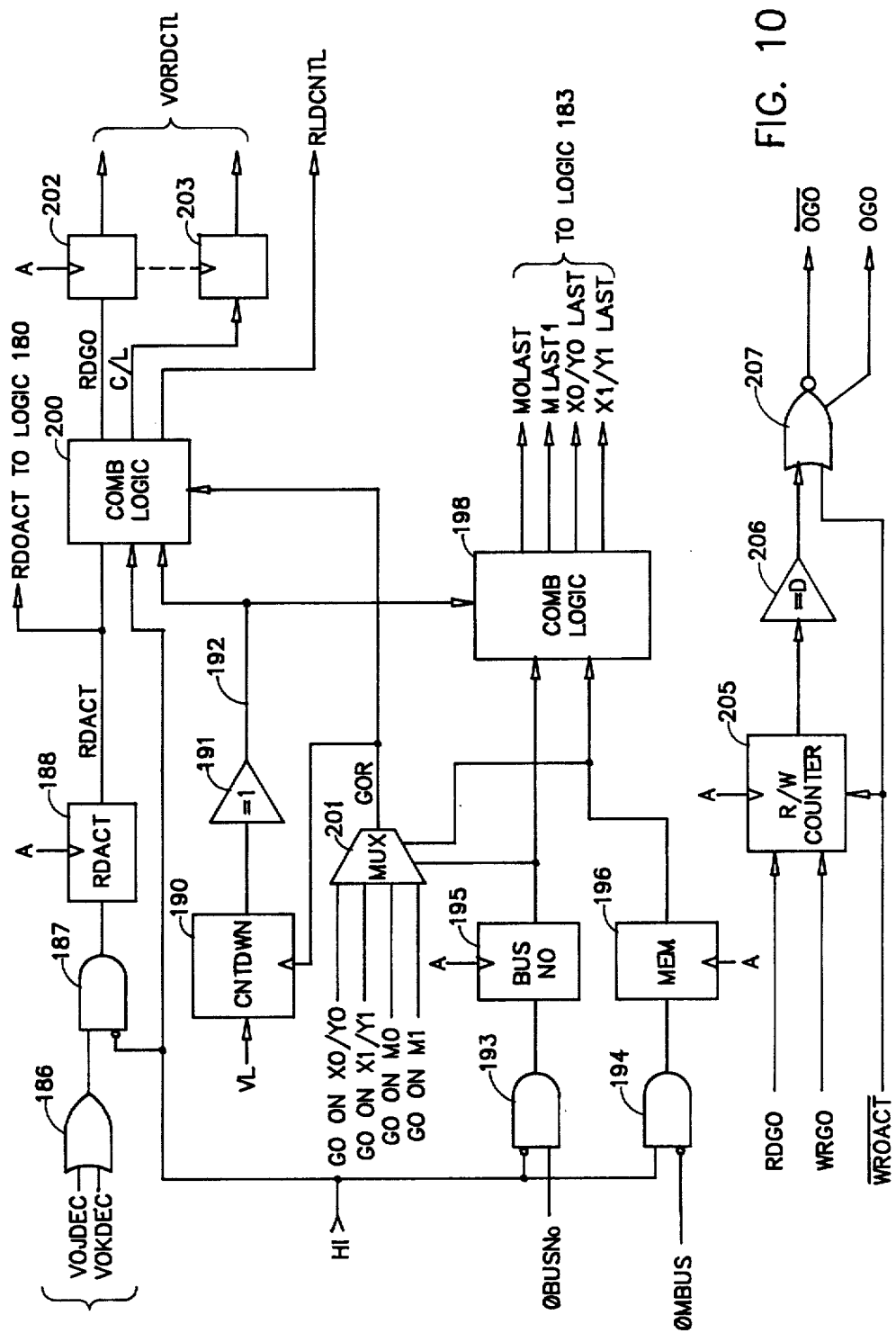
FIG. 10 is a block diagram of a read engine in the vector control unit.

VRDENGO, illustrated in FIG. 10, is explained in terms of controlling register V(0); however, the figure is representative of the read engines that control registers V(1)–V(7). The function of the read engine is to operate a specific V register so that a stream of vector elements is read from the register onto an assigned operand or memory bus, and to indicate when the last element is being placed on the assigned bus. When the register being read is also being written, the function of the read engine is further to ensure that fresh vector elements are read to the bus by maintaining the read pointer at least a predetermined distance behind the write pointer.

In the illustrated read engine, a read active circuit includes gates 186 and 187 and a flip-flop 188. When the current instruction requires a vector to be read from register V(0), either a V0JDEC or V0KDEC signal, indicating that register V(0) has been designated in the j or k instruction field, is provided through the gates 186 and 187 to the flip-flop 188. The AND gate 187 is controlled by the HI signal issued by the logic 180. Assuming that all of the required resources are available, one of the decode signals is fed to the AND gate 187 to set the flip-flop 188 on the next A clock cycle. The set condition of the flip-flop 188 activates a read active (RD0ACT) signal indicating that the read engine is busy. This signal is fed back to the logic 180 for instruction issue determination and is also fed to a combination logic circuit 200 which issues a read load control (RLDCNTL) signal. The RLDCNTL signal, when initially activated by RD0ACT, will set the flip-flops of the read engine and cause the vector length to be latched into the engine. When RLDCNTL is deactivated, it clears all of the read engine storage circuitry and resets all read engine combinational and count logic to an initial or ready state.

RLDCNTL latches the vector length (VL) value into a conventional countdown circuit 190 which provides a decrementing count to a conventional digital comparator 191. The vector length is counted down each time a pulse is received at the countdown circuit clock port. Decrementation of the countdown value to one is indicated through the comparator 191 by a signal on the signal line 192. The countdown circuit indicates which element of the vector is being read to a bus; it decrements only when the previous element has been transferred to a bus. When the last element of the vector is being read, the counter's contents are one. At this point, signal line 192 indicates that the register will be available on the next transfer cycle.

The bus being driven by the register V(0) is indicated by a bus designation circuit including gates 193, 194, and flip-flops 195 and 196. The gates 193 and 194 are gated by the HI signal so that if the instruction is issued, HI activates the gates; holding the instruction will result in the gates being blocked. A binary signal 0BUSNO is fed to gate 193; one of its states indicates bus 0, the other bus 1. A signal 0MBUS is fed to the gate 194 and is set when one of the memory buses is to receive the V(0) vector; it is reset when the vector is to be provided to an operand bus. The state of the gates 193 and 194 is captured by the flip-flops 195 and 196 when the RLDCNTL signal is set. The compound output of the elements designates the specific memory or operand bus to which the V(0) vector is provided. It should be evident that the signal is a 4-state signal, each state of which uniquely defines one of the buses M0, M1, X0/Y0, or X1/Y1. The signal from the flip-flops 195 and 196 is fed to a combinational logic circuit 198 that also receives the last count indication from the comparator 191.

A read pointer control circuit in the read engine comprises the combinational logic 200, a multiplexer 201, and a pair of flip-flops 202 and 203. The multiplexer 201 receives as a select signal the bus indication signal. The select signal determines which of four input paths is connected to the output signal path of the multiplexer, on which a GOR signal is provided. The inputs to the multiplexer 201 are received from the result scheduler 184. Each of the inputs to the multiplexer 201 conducts a pulse signal that is provided to indicate the provision of a vector operand element on the bus assigned to the read engine. The input signal that is selected by the multiplexer 201 is pulsed during each bus cycle that the read engine causes an operand element to be placed on the assigned bus. The pulsed signal is fed by the multiplexer 201 as the GOR signal to the countdown circuit 190, the combinational logic 198, and the combinational logic 200.

The combinational logic 198 receives the compound bus assignment signal and the last element indication from the comparator 191. When the LAST signal is sensed on the signal line 192, the logic 198 will produce a signal xxLAST indicating that the last operand element or pair of elements has been placed on the bus assigned to the read engine. For example, when the LAST signal is present on the signal line 192, and the read engine has been assigned operand bus X0Y0, the combination logic 198 will produce the X0Y0 LAST signal. The xxLAST signals are used to signal the bus control logic 183 that a bus is being released and may be assigned to another process.

The read pointer control circuit that produces the V0RDCTL signal (fed to the read pointer 151 of FIG. 6A) includes the combination logic 200 and the flip-flops 202 and 203. When the engine is activated, the logic 200 sets a COUNT/LOAD signal to a COUNT state, then each time the GOR pulse is provided through the multiplexer 201, the combination logic 200 produces a read go (RDGO) signal. If the GOR signal is not pulsed during a transfer cycle, the RDGO signal will not be activated. The flip-flops 202 and 203 latch the states of the RDGO and COUNT/LOAD signals at the beginning of each transfer cycle and provide a V0RDCTL signal that reflects that state: if the RDGO signal is positive, the V0RDCTL signal assumes an increment state that permits the read pointer to increment; otherwise, the V0RDCTL signal assumes a hold state that prevents the read pointer from incrementing. When the LAST indication is received by the logic 198, it sets the COUNT/LOAD signal to a LOAD condition, causing the RDCTL signal to reset the register read pointer.

A read/write pointer circuit in the read engine keeps track of the validity of the data in register V(0) when the register is being simultaneously read from and written to. The function of the circuit is to ensure the data being read from the register is not stale. In this respect, data is "stale" in a register when the register containing the data is scheduled for receiving new contents. In the vector registers, data read from a register being written to is stale unless the read process is reading data already entered by a simultaneous write process. Thus, data freshness is maintained by constraining the register read pointer to maintain a predetermined distance (D) behind the register write pointer when both the read and write pointers are active. This ensures that the vector elements read from the register will be fresh. The read/write pointer circuit is clocked by the A clock and is initialized when a write operation is initiated against the register V(0); this is indicated by the WR0ACT signal. Each time an element is written to the register, a WRGO signal (the write pointer control signal) causes the circuit 205 to increment the count; each time the RDGO signal is set, the count is decremented; if RDGO and WRGO are simultaneously activated during a transfer cycle, the count is held. The comparator 206 indicates whether or not the count in the counter exceeds the predetermined distance D; this indication is fed, together with the WR0ACT signal to the gate 207. So long as a write operation is being executed against the register V(0), the output of the gate 207 will be determined by the output of the comparator 206. In this circumstance, so long as the count exceeds the distance D, the output (0GO) of the gate will be set, indicating that the next element can be read from the register. When the counter value equals the distance D, the 0GO signal will assume a state preventing the next V(0) element from being read; the 0GO signal will be kept in this state until the WRGO signal pulses, indicating the register write pointer has incremented.

Figure 11:
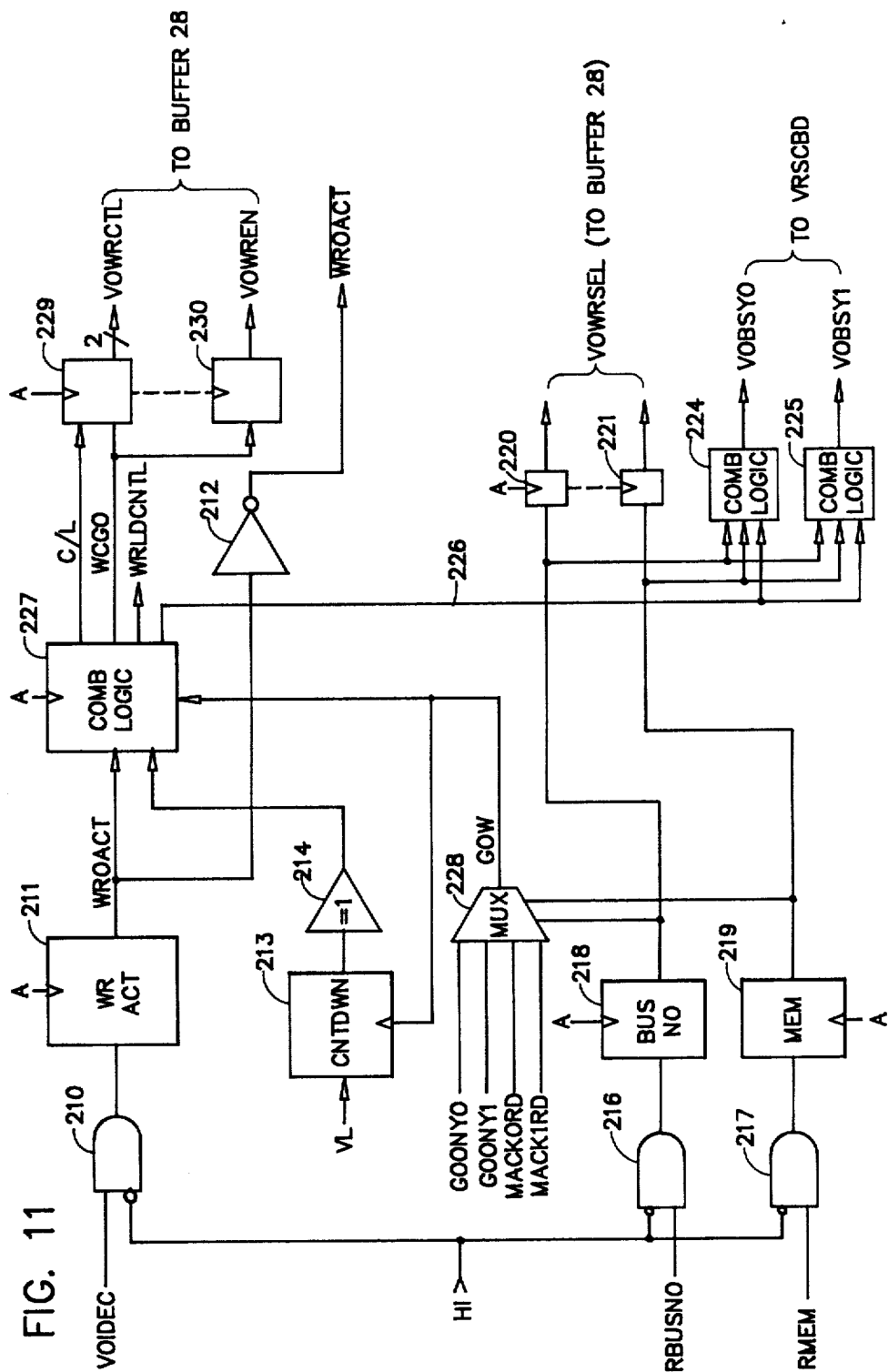
FIG. 11 is a block diagram of a write engine in the vector control unit.

The structure and operation of the write engine for register V(0) can be understood by reference to FIG. 11. Again, FIG. 11 is representative of logic that is replicated eight times, once for each of the vector registers. The primary function of a write engine is to provide the V0WRCTL, V0WREN, and V0WRSEL signals to the buffer 28 for control of write operations to the register V(0). To this end, the write engine includes an activation circuit (gate 210, flip-flop 211) that responds to the V(0) identification in the i field of the current instruction to produce a write active (WR0ACT) signal in the same manner that the read engine activation circuit produces the RD0ACT signal. The WR0ACT signal is inverted by inverter 212 to produce the $\overline{WR0ACT}$ signal fed back to the read engine of FIG. 10. A countdown circuit (counter 213 and digital comparator 214) counts down in response to a go write (GOW) signal. As with the corresponding circuit in the read engine, the countdown circuit is initialized to the vector length (VL) when a write operation to the register V(0) begins. This initial count defines the size of the vector to be entered into the register. Then, each time the engine generates a set of signals to write an element into the register, the count is decremented. When the set of control signals for the last element are sent to the register, the comparator 214 gives indication of such to the combinational logic 227.

A result bus designation circuit (AND gates 216 and 217 and flip-flops 218 and 219) associates the operation of the write engine with the designated result or memory bus from which a vector is written to the register V(0). This circuit is essentially identical to the corresponding circuit in the read engine, with the exception that the RBUSNO and RMEM signals are obtained from result bus scheduling circuitry described below. A compound bus assignment signal, from the bus designation circuit and indicating the assigned result or memory bus, is fed to a pair of flip-flops 220 and 221 which, together produce the V0WRSEL signal fed to the multiplexer 85 on the buffer 28 to connect the selected result or memory bus to the register V(0). A result bus busy circuit includes combination logics 224 and 225. The logics 224 and 225 are essentially equivalent, however, one produces a signal indicating the result bus Y0 is busy (V0BSY0), while the other produces a signal indicating the Y1 result bus is busy (V0BSY1). The logics 224 and 225 receive the compound bus assignment signal from the elements 218 and 219, together with the WR0ACT signal to produce one of the result bus busy signals for so long as the write engine is active and assigned to write a vector received over an assigned result bus; each logic is reset to an initial state indicating bus availability, in response to a LAST ON REG signal. The LAST ON REG signal is provided by the logic 227 on signal line 226; it signifies that the last result vector element is being entered into the register from the assigned result bus. Control of the write pointer and provision of the write enable for register V(0) is provided through a write control circuit (logic 227, multiplexer 228, and clocked storage elements 229 and 230) that operates in essentially the same manner as the corresponding circuit in the read engine of FIG. 10. The write control circuit provides a WRCTL signal having COUNT, HOLD, and LOAD states; it provides count states of WRCTL and WREN each bus cycle when the go write (WRGO) signal is produced by the logic 227. As with the read engine logic 200, the combination logic 227 produces a write load control (WRLDCNTL) that sets all write engine clocked storage elements and loads the counter 213 when the WR0ACT signal is activated and resets all of the storage elements and the counter 213 when the last element indication is received from the comparator 214.

Figure 12:
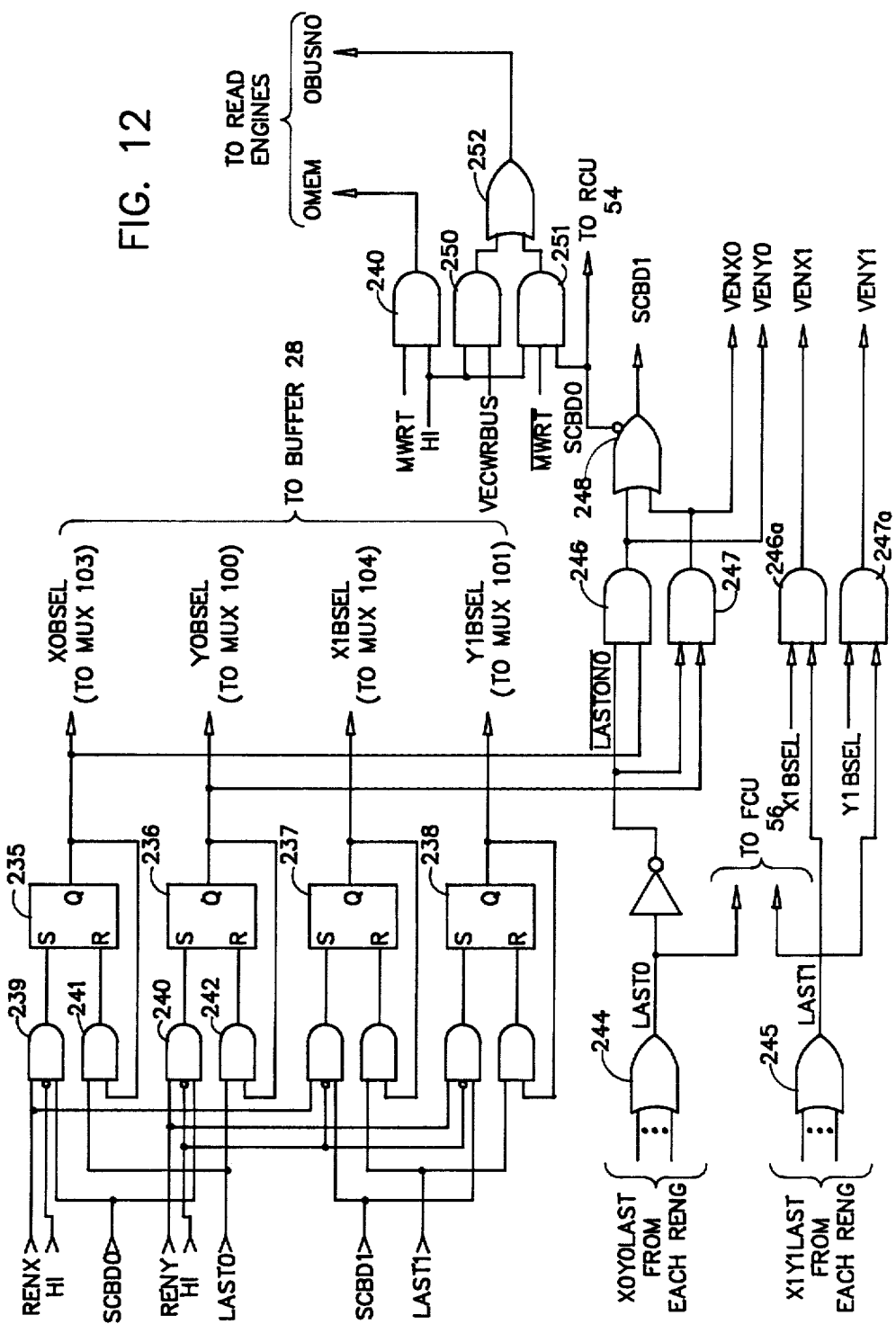
FIG. 12 ia block diagram of an operand bus scheduler in the vector control unit.

The bus control logic 183 includes operand and result scoreboards illustrated in FIGS. 12 and 13, respectively. Each of the scoreboards monitors the availability of function buses and serializes the access of vector instruction execution processes to these buses.

In FIG. 12, resettable flip-flops 235–238 operate to monitor the availability of the operand buses and to select them according to a predetermined priority when the current instruction requires their use. The requirement for an operand bus is obtained from the ENX and/or ENY signals in the CWRD. The availability of an operand bus is indicated by the signals SCBD0 and SCBD1, binary scoreboard signals whose states indicate the availability of a respective operand bus pair. The assignment priority seeks to assign the first operand bus X0/Y0 when both buses are available and then the second operand bus X1/Y1 when the first is busy. The assignment signals are gated to the flip-flops 235–238 by the HI signal. Thus, if the instruction is to be issued, the state of the HI signal will permit the provision of the assignment signals to the flip-flops. The logic 180 monitors the operand bus status signals (X0BSEL, Y0BSEL, X1BSEL, and Y1BSEL) to determine whether at least one operand bus is available when a vector instruction requiring and operand bus is in the instruction registers. If at least one select signal from each operand pair is set, the logic 180 will restrain issue of the instruction by activating its HI signal; this will block provision of the ENX and/or ENY and SCBD signals to the flip-flops 235–238; each of the flip-flops is reset by a respective combination including its own select signal and a LAST$_x$ signal related to placement of the last element of the vector being read onto the operand bus whose availability the element is monitoring.

For example, assume that the CWRD indicates an instruction requiring both signal paths of an operand bus and that both operand buses are available. In this case both the ENX and ENY signals will activate, SCBD0 will be active, and signals will issue from the gates 239 and 240 because HI will be inactive. The gates 239 and 240 will set the flip-flops 235 and 236, causing the signals X0BSEL and Y0BSEL to assume a state indicating bus activity. Assume next that the last element of each of the vectors being streamed onto the X0/Y0 bus pair is placed on the bus. Now, the read engines for the vector registers assigned to the operand bus pair will both produce X0/Y0 LAST signals (FIG. 10, combination logic 198). As explained below, this will result in the production of the LAST0 signal which, in combination with the X0BSEL and Y0BSEL, will reset the clocked elements 235 and 236. This will send the select signals to a state indicating that the X0/Y0 operand bus is available. Inspection of their input gate circuits will reveal that the flip-flops 237 and 238 operate identically to the just-described elements, with the exception that they assign either or both of the X1/Y1 signal paths only when the SCBD1 signal is set, that is, when the first operand bus is busy.

The select signals produced by the flip-flops 235–238 are fed to the multiplexers 103, 100, 104, and 101, respectively, in the buffer 28 to select vector register sources for the respective operand bus signal paths connected to the multiplexers. When these signals are inactive, their reset condition defaults the buffer multiplexers to a state selecting scalar sources for the operand buses.

The LAST0 and LAST1 signals are developed in the gating circuit including OR gates 244 and 245. Each of the OR gates 244 and 245 collects X0Y0LAST and X1Y1LAST signals from each of the read engines (FIG. 10, logic 198) and activates the respective LAST signal whenever one of the inputs is activated. The LAST0 signal from the gate 244 operates to reset the operand bus control flip-flops 235 and 236, while the LAST1 signal produced by the gate 245 resets elements 237 and 238. Both LAST signals are also forwarded to the RCU 54 to permit it to monitor operand bus activity.

The scoreboard (SCBD) signals are developed from the LAST0 signal which is inverted and fed to the AND gates 246 and 247. The AND gate 246 combines the X0BSEL and inverted LAST0 signals, while the gate 247 combines the LAST0 signal with the Y0BSEL signal. So long as one of the signal paths of the X0/Y0 bus is active transferring any but the last of the elements of a vector, the AND gates 246 and/or 247 will provide positive logic signals to the OR gate 248. These signals determine the positive sense output of the OR gate 248 (SCBD1) and the inverted sense output (SCBD0). Thus, while either signal path of the X0/Y0 operand bus is in use, the OR gate 248 will activate the SCBD1 signal, which will steer the next operand bus request from a vector instruction to the status flip-flops 237 and 238. During the transfer cycle when the last element of a vector is being placed on at least one of the X0/Y0 operand bus signal paths, the output of the OR gate 248 will change, setting the SCBD0 signal and resetting the SCBD1 signal; now, the next operand bus request will be directed to the status flip-flops 235 and 236. The SCBD0 signal is also forwarded to the RCU54.

Bus driver enable signals VENX0, VENY0, VENX1, and VENY1 are produced by the bus logic of FIG. 12 and fed to the SCU 50 to generate enable signals for the drivers 98c–f, respectively. These signals are taken from the outputs of AND gates 246, 247, and 246a and 247a, respectively. The operation of the AND gates 246 and 247 has been explained; the gates 246a and 247a operate correspondingly, except that they respond to the LAST1 and X1BSEL and Y1BSEL signals.

Differentiation between the assignment of memory and operand buses by the operand bus scoreboard of FIG. 12 is provided by the gating circuit comprising the AND gates 249–251 and the OR gate 252. When the MWRT signal indicates that the next vector read operation results from a VCMWR instruction, and the instruction is permitted to issue, the gate 249 provides the OMEM signal, indicating that the current read engine is to be linked to one of the memory databuses. The gate 250 will assume a state indicating which of the memory buses is to receive the vector in response to the state of the VECWRBUS signal received from the MCU 46. Of course, if the VECWROK signal indicates that the current vector memory reference instruction cannot proceed because of the unavailability of memory control resources, the issue logic 180 will set the HI signal, deactivating the AND gates 249 and 250 until the memory control resources become available. When the current vector instruction does not require a memory reference, the $\overline{\text{MWRT}}$ signal (produced by the issue logic 150) will activate the gate 251, whose output will follow the SCBD0 signal so long as the HI signal indicates the instruction is to issue. Thus, the OR gate 252 will provide the number of either the operand or memory bus in the form of the OBUSNO signal, which will be provided at instruction issue concurrently with the OMEM signal to be latched into the bus assignment storage elements of the read engine or engines selected by the j and k fields of the current instruction.

The result bus scheduler, illustrated in FIG. 13, consists of a plurality of gates that are connected to develop the RBUSNO and RMEM signals provided to the write engines. The assignment of the result bus Y0, indicated by a Y0BSY signal, is provided when the OR gates 253 and 254 detect either a VxBSY0 signal from one of the eight write engines or a RVY0BSY signal from the RCU 54. The first set of signals, collected on the OR gate 253, indicates that one of the write engines is transferring a vector from the Y0 result bus to its respective vector register, while the OR gate 254 detects either that a vector register is being sourced by the Y0 result bus or that a scalar register is being sourced from the Y0 result bus (indicated by the RVY0BSY signal). The Y1BSY signal is developed by a gating circuit identical in all respects to the Y0BSY circuit, with the exception that the Y1 gate circuit monitors the assignment of the Y1 result bus to either a vector or scalar register. Both the Y1BSY and Y0BSY signals are fed to the RCU54. The RBUSNO and RMEM signals are developed by a gating circuit identical in all respects to the corresponding circuit in the operand bus scheduler of FIG. 12, with the exception that the circuit responds to the state of MRD signal in the CWRD and to the VECRDBUS from the MCU46. It should be evident that the issue logic 180 determines the state of the $\overline{\text{HI}}$ signal when a VECMEMRD instruction is offered for issue in response to the VECRDOK signal from the MCU46.

Operand and result scheduling for the memory databuses is illustrated in FIGS. 14A and 14B, respectively. FIG. 14A, the memory bus data scheduler, is represented by a circuit that monitors the use of the M0 databus during a VCMWR instruction execution sequence. It is to be understood that a corresponding circuit is provided for the M1 databus. The OBUSNO and OMEM signals from the operand databus are provided to a decode circuit 260 which pulses the set input to a resettable flip-flop 261 when the M0 memory bus is to be provided with a vector for storage in the main memory. When the flip-flop 261 is set, it provides an M0BSY signal, indicating that one of the vector registers is engaged in sourcing the M0 databus. The flip-flop 261 is reset by the provision of one of an OM0LAST signals from a read engine combined with the M0BSY signal by the gates 262 and 264. In this respect, the flip-flop 261 operates in essentially the same manner as the operand bus select flip-flops 235-238. While the M0BSY signal is set, the combinational logic circuit 266 will respond to each provision of the MACKWR0 signal from the MCU 48, indicating the availability of the main memory location to which the current vector element is to be written.

The logic 266 operates while M0BSY is set by waiting for the MACKWR0 signal to indicate the dispatch of write control signals to the main memory by the MCU 46. When the MACKWR0 signal is received concurrently with a read engine GO signal, the logic 266 produces GO ON M0, which is provided to the read engine, and which will cause the read engine countdown counter to be decremented and a VxRDCTL signal to be produced. The logic 266 also at this time produces MEMOK0, which causes the concerned memory coupler to increment to and request the next memory address. The logic also produces a latch control signal, MW0BEN, provided to the M0 section of the latch 97. The latch control causes the latch 97 to retain the vector element last read from V(j) until receipt of the MACKWR0 acknowledging entry of the data element into memory. Concurrently with MW0BEN, the logic 266 produces the M0BEN driver enable signal provided to the driver 98g.

The VxGO signal from the read engine controlling the provision of a vector to the M0 databus is provided to the logic 266 by a register designation and decoding circuit comprising the latch 267, gate 269, and multiplexer 270. The latch 267 is strobed by the A clock whenever the M0BSY signal is set. When strobed, the latch 267 will retain the V register designation in the j field of the current instruction and use the retained designation as a select signal for the multiplexer 270. This establishes a signal path between the read engine involved with the M0 databus transfer and the logic 266 that develops the GO ON M0 pulse.

The GO ON M0 output of the logic 266 is fed to each of the read engines, with the proper read engine receiving the signal due to the condition of its multiplexer corresponding to the multiplexer 228 of FIG. 11. Thus, the memory scheduler of FIG. 14A synchronizes the acknowledgment signal provided by the MCU 46 each time a vector element is written to the main memory on the M0 databus with the GO signal produced by the concern read engine that monitors the freshness of the contents of the concern vector register.

When a vector register has been designated in the j field of a VCMWR instruction as the source of vector data to be written to main memory, the vector register identification will be latched to the latch 267 for so long as the M0 databus is busy with execution of the instruction. Signification of the read engine responsible for vector register operations required for execution of the instruction is provided by a decoder 273, which receives the latched j field value and decodes it to a single signal VxJDEC, with the x corresponding to the vector register involved in the execution. This signal corresponds to the identically-named signal fed to the gate 186 in FIG. 10. The output of the latch 267 also constitutes the select signal VM0SEL fed to the multiplexer 115 to connect the designated V register to the M0 databus.

FIG. 14B illustrates the production of the GO ON M0 signal that is fed to the write engines to synchronize their operations with the operations of the memory couplers in the MCU 46 for VCMRD instructions. The memory result bus scheduler of FIG. 14B consists of a pair of conventional delay elements 275 and 276, each of which delays a respective MACKR0 acknowledgment signal from the MCU 46 by the number of bus cycles required by the main memory to output a data element in response to memory read control and address signals. In the preferred embodiment, the memory read delay is five transfer cycles. After the delay, the concerned delay element produces the required GO ON M0 signal, which is fed to all the write engines. When the concerned write engine receives the GO ON MX signal, it will, of course, decrement its countdown circuit, while providing the control and address signals necessary to read the element, now on a memory bus during the result phase of the current transfer cycle, into the proper V register.

FIG. 15 illustrates the result scheduler 184; this scheduler synchronizes the provision of one or more vectors to a same functional unit over a respective one of the operand buses, and also synchronizes the provision of the operand vector or vectors to the conduction of the result vector on one of the result buses. In performing this synchronization function, the result scheduler accounts for two possible situations. In the first situation, it could be the case that one of a pair of operand vectors is being read from a vector register onto an operand bus while the register is being written to from one of the memory databuses. If the memory coupler involved in the memory bus transfer loses a contest for a memory location and fails to provide an acknowledgment signal, the interruption in streaming of the vector to the vector register will cause the synchronization circuit to similarly interrupt the provision of the other operand vector and the provision of results. The second situation occurs when a vector register being read for an operand is being simultaneously written and the read pointer approaches to within the predetermined distance of the write pointer.

In either case, the VxGO signal from the interrupted vector register will indicate when a vector read operation is interrupted. It is this signal from each of the read engines involved with the operand databus transfer that is monitored by the result scheduler.

The result scheduler contains a pair of vector register designation and decoding circuits for the j and k instruction fields that correspond essentially to the vector register designation and decoding circuit of FIG. 14A. The designation and decode circuit for the vector register designated by the j field of the current vector instruction includes a gate 290 strobing a latch 291 which holds the code identifying the V register designated in the instruction j field. The latch 291 is strobed when the X0BSEL signal produced by the operand scoreboard of FIG. 12 rises (causing the X0BSE0V signal to fall). The V register identification strobed to the latch 291 is decoded by the decoder 292 to provide the VxJDEC signal that activates the read engine for the vector register Vx. The contents of the latch 291 also establish the conductivity of the multiplexer 293 which receives the GO signals from all of the read engines and connects its output to the GO signal provided by the read engine identified by the output of the decoder 292. The output of the latch 291 is also fed as VX0SEL to the multiplexer 108 in the buffer for selection of the vector register which is to feed the X0 signal path of the X0/Y0 operand bus.

An identical register designation and decoding circuit comprising the gate 295, the latch 296, the decoder 297, and the multiplexer 298 designates the other register identified in the k field of the instruction that is to be involved in the current instruction, provides the VY0SEL signal to the multiplexer 106, and provides a signal to activate the read engine of the V(k) register. Thus set, the read engines for the V(j) and V(k) registers will be active and their GO signals fed to the result scheduler until the X0/Y0 LAST signals produced by the read engines reset the X0BSEL and Y0BSEL signals by resetting the storage elements 235 and 236 of FIG. 12. With the conduction configuration of the multiplexers 293 and 298 thus established, the AND gate 300 will provide a GO ON X0Y0 pulse every time the GO pulses from the registers V(j) and V(k) coincide. An identical GO signal synchronization circuit 301 is provided for the operand bus pair X1/Y1 and is controlled by the X1BSEL and Y1BSEL select signals. The circuit 301 drives the AND gate 303, which produces a GO ON X1Y1 signal when the GO signals from the vector registers driving that bus pair coincide.

The output of both of the AND gates 300 and 303 is provided to each of the read engines. As explained above in connection with the operation of the read engine in FIG. 10, the read engine multiplexers corresponding to the multiplexer 201 will be conditioned to route the signals produced by the gates 300 and 303.

The routing circuit 305 receives the SCBD0 signal from the scoreboard of FIG. 12 and the Y0BSY signal from the result scoreboard of FIG. 13 to determine respective routes for the GO ON operand signals produced by the gates 300 and 303. Essentially, the circuit 305 associates an operand with a result bus and permits the scheduler of FIG. 15 to sense the placement of operands on an operand bus and then to delay this event the appropriate number of bus cycles consumed by the functional unit to which the operands are delivered. Delay of the GO ON operand bus signal will then be sensed by the write engine responsible for entering the result from the functional unit into a V register. For functional unit operations, the GO ON operand bus signals produced by the gates 300 and 303 are each delayed the number of clocks dictated by the length of operation of a respective functional unit. The write engine then selects the appropriate output from the result scheduler and generates the write engine control from it.

To this end, the logic 305 will route the GO ON scoreboard signal produced by each gate 300 and 303 to a delay circuit that will produce the GO ON result bus signal for the result bus associated with the operand bus for performance of functional unit operand and result transfers. Two routing configurations are available, and are determined by the state of the SCBD0 and Y0BSY signals. For example, a vector instruction resulting in the assignment of the X0Y0 operand bus for transfer of operands to a functional unit and assignment of the Y0 result bus for return of results from the functional unit to a V register will route the GO ON X0Y0 signal to the signal path 307 to produce a GO ON Y0 signal provided to the write engines. The delay through the functional unit performing the operation is accounted for by a circuit including delay elements 310-313, a multiplexer 314, and a clocked storage element 315. At the time the instruction issues, the CWRD will include a signal indication of the operational time (OPTM) consumed by the functional unit required by the instruction to perform its operations. In the preferred embodiment, no functional unit consumes more than four bus transfer cycles to perform operations, thus, each of the elements 310-313 delays the GO On X0Y0 signal by one clock cycle, with the maximum delay being four clock cycles from element 310 through element 313. The OPTM value is latched to the clock storage element 315 and forms the select signal that enables the multiplexer 314 to couple the GO ON X0Y0 signal from the proper point in the delay element chain. The delayed GO ON X0Y0 signal is provided as the GO ON Y0 provided to the write engines. The signal path 308 provides conduction to another functional unit delay circuit identical to the just-described circuit that is used to produce the GO ON Y1 signal fed to the write engines.

The routing circuit has two possible states: route the first operand bus (X0Y0) to the delay circuit for the Y0 result bus and X1Y1 to the Y1 delay circuit; or, X0Y0 to the Y1 delay and X1Y1 to the Y0 delay. Its condition is set by the states of the SCBD0 and Y0BSY signals. Thus, if both operand buses are available and X0Y0 is selected, the circuit 305 will route GO ON X0Y0 to the Y0 result delay if Y0 is available. If, however, the RCU has scheduled Y0 for use, it will set RVY0BSY, causing Y0BSY to set and routing GO ON X0Y0 to the Y1 delay.

RESULT CONTROL UNIT

Figure 16:
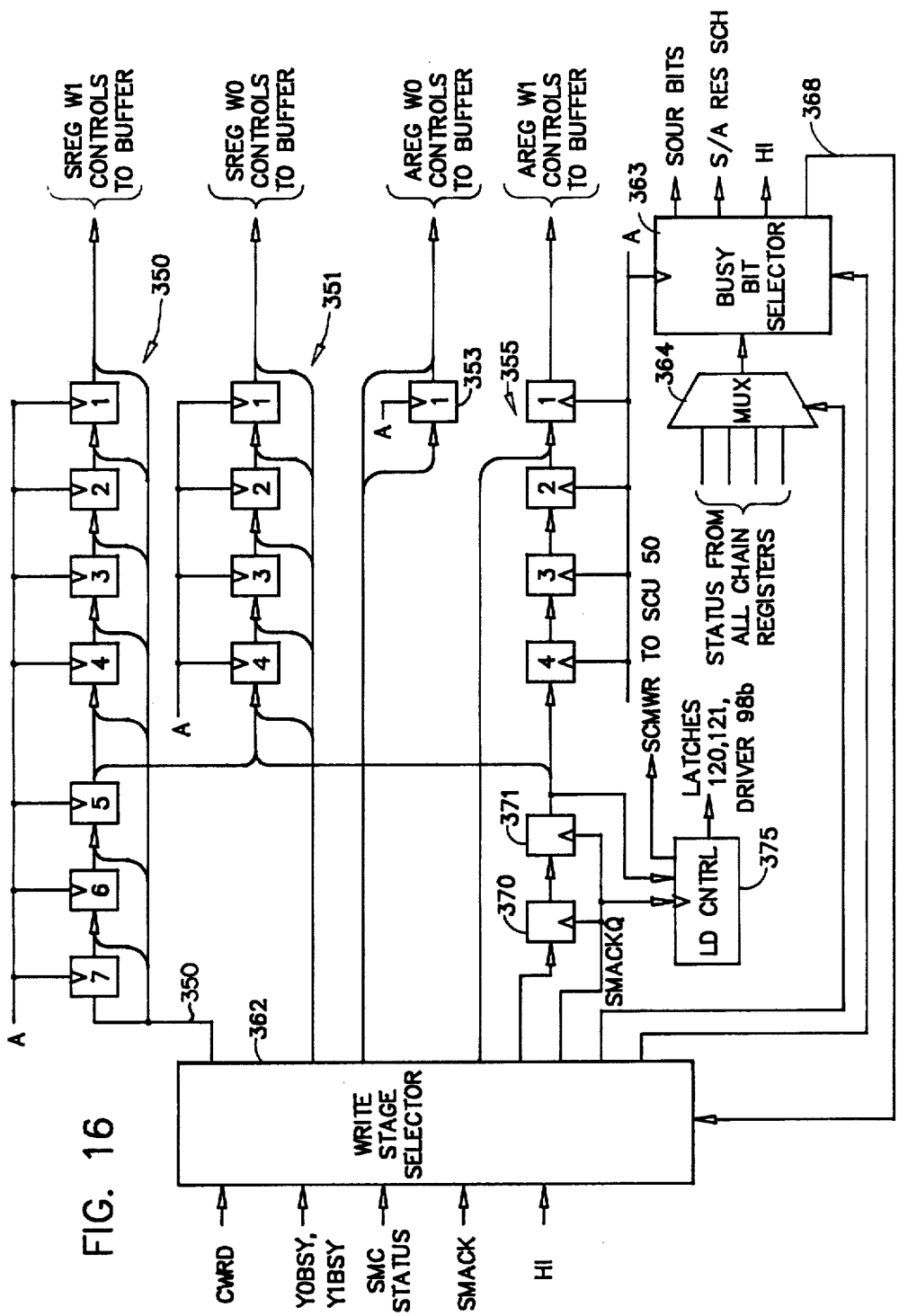
FIG. 16 is a block diagram of the result controller that controls the transfer of scalar data objects to the scalar registers of the buffer from the memory and fun databases.

Refer now to FIGS. 3 and 16 for an understanding of the RCU 54 which includes the I register 74. The contents of the register 74 constitute a pointer into the microcode of the control decoder 75, the operation code and the i, j, and k fields of the current instruction. The control decoder 75 is a 256-word by 84-bit microcoded RAM. The decoder 75 is addressed by the operation code held in the register 74. The decoder 75 contains in each location a microcode word constituting the CWRD which controls, or initiates, functions in the RCU 54, VCU 52, MCU 46, and functional unit control 56. A portion of the CWRD produced by the decoder 75 is passed to the result control logic 77.

The result control logic 77 responds to the CWRD by scheduling the resources necessary to enter (write) scalars into the S and A registers from the scalar memory or result buses. The CWRD informs the logic 77 when the instruction in the register 74 requires transfer of a scalar result from a functional unit. In this regard, the instruction signifies the register to which the result is to be written, indicates the requirement for a result bus, identifies the functional unit producing the result, and indicates the functional unit processing time in bus transfer cycles. The logic 77 is also informed whenever a scalar memory reference instruction is current; for scheduling scalar memory resources, the logic 77 also receives the SMC STATUS and SMACK from the MCU 46. Finally, in order to correctly schedule resources, the logic 77 is informed whenever a vector instruction requiring operand and result buses is poised for issue.

The logic 77 contains instruction issue logic, and a scalar result scoreboard. The issue logic decides as each instruction is being decoded, whether or not the instruction should be issued. If the logic detects that resources necessary for the instruction are unavailable, the HI signal is generated. As with the other control units, the RCU issue logic also monitors signal line 60 (FIG. 1) so that, if another control unit generates an HI signal, the RCU 54 will not assign resources for the current instruction.

The RCU 46 decodes all memory reference instructions and forwards the portion of the CWRD signifying these instructions to the MCU 46 when no control unit has held issue of the instruction. VCMRD and VCMWR instructions are decoded and provided as a CWRD portion to the VCU 52. If the instruction requires a scalar memory reference, a memory request generator in the logic 71 monitors the progress of each memory reference in order to predict when data will be transferred from or to the main memory. The scalar result scoreboard schedules the resources required for all scalar operations which cause a result scalar to be returned at some cycle following issue of a scalar instruction producing a result from a functional unit. The scalar result scoreboard receives all the information necessary to write the result scalar when it is returned, and to keep track of result bus allocation and S/A register write slot allocation.

The logic 77, illustrated in FIG. 16, consists of four write timing chains 350, 351, 353, and 355. The chains 350 and 351 schedule and control the resources necessary to write a scalar result to an S register during the W1 and W0 write slots, respectively, of a transfer cycle. The chains 353 and 355 perform corresponding functions for A register data entry during the W0 and W1 write slots, respectively. The timing chains 350, 351, and 355 each consist of two or more conventional shift registers, connected to shift data to the right in synchronism with the A clock.

For example, the timing chain 350 consists of a first chain of registers numbered 5-7 which keep track of outstanding scalar operations which were started during previous bus transfer cycles. Each of the registers 1-4 in the chain 350 contains the information necessary to complete entry of a scalar into an S register during the W1 write slot of a bus transfer cycle and to reserve all of the resources necessary to complete the data entry. Each cycle each register passes its information onto the register to its right. The right-most register passes its information to the buffer 28 to cause a write operation to be performed on a S register during the W1 write slot of the current bus transfer cycle; this results in storage of a result scalar in the S register. The information in each register includes: the designation of the register to receive the result (S(i)), the result bus to be used, a write source select signal for the multiplexer 88 of FIG. 4, and a valid indicator denoting that the contents of a register are valid and therefore, that the write slot is reserved for the indicated cycle. Each register of the chain 350, save the left-most, can be loaded from the register to its left; each register of the chain can also be loaded from the signal path 359. The numerals in the boxes representing the registers of the chain represent the number of bus transfer cycles required to move the contents of the register to the buffer 28 stationed, functionally, at the end of the chain. The buffer receives data either from the righthand most register of the chain 350 or from the signal line 359. The data given the buffer contains all of the W1 control signals required to route data from the designated databus source to and write it in the designated register. These signals include WR1S, WR1SEL, and WR1SEN that are shown in FIG. 5A. These signals are provided in synchronism with the A clock to the buffer 28 each bus transfer cycle. The WR1SEN signal will cause an S register write to occur only if the valid bit is set in information received from the righthand register of the chain 350 or if the data is received on the signal line 359.

It is to be understood that the timing chains 351, 353, and 355 operate in essentially the manner of chain 350 for writing to registers.

The RCU logic 77 also includes a write stage selector 362, a busy bit selector 363, and a multiplexer 364. The write stage selector comprises conventional combinational logic circuitry which responds to memory reference and functional unit operation instructions (in the form of CWRD signals) to schedule the assignment of buffer and bus resources necessary to effect entry of data into S and A registers. When an instruction requiring a result bus is in the register 74, all four chains are inspected for result bus availability at the transfer cycle point which corresponds to the operation time of the instruction. Assume that an instruction in the register 74 requires writing a scalar result to an S register five transfer cycles in the future. The availability of resources at that time can be ascertained by inspection of the contents of the registers in the fifth cycle time slot (i.e. those containing the numeral 4 in FIG. 16). The contents are compared against the resource requirements of the current instruction in the busy bit selector 363, and if any one of the resources necessary to complete the write is occupied, the selector 363 issues the HI signal.

The selector 363 is enabled to compare the contents of the registers in any designated time slot of the four timing chains by operation of the multiplexer 364. The multiplexer 364 receives an instruction operation time signal obtained from the CWRD on signal line 366 from the selector 362 indicating te first cycle following the present one in which the instruction will require a result bus. The operation time is used as an input channel select signal for the multiplexer 364 and operates to connect from the timing chains all registers in the time slot signified by the instruction operation time. Thus, to inspect the contents of the registers in the fifth time slot, the OPTM signal equals 5, and the contents of the registers in the fifth time slot of the chains 350, 351, and 355 are connected to the busy bit selector 363. The busy bit selector 363 also receives on signal line 367 the resource requirements obtained by the selector 362 from the CWRD. The selector includes conventional combinational logic which compares the requirements on signal line 367 with the resource allocation to determine whether to generate the HI signal or to provide a busy bit indication on signal line 368 to the write stage selector 362. If the busy bit selector determines that the resources required for an S or A register write are available in the required time slot, it provides a busy bit indicator on signal line 368 to the write stage selector 362.

The write stage selector, in response to a busy bit indication from the selector 363, will enter the resource scheduling information into a register in the time slot indicated by the operational time portion of the CWRD and set the valid bit to indicate the assignment.

The VCU result bus status signals Y0BSY, Y1BSY are also forwarded on signal line 367 to the busy bit selector 363. Thus, when a scalar instruction requiring use of a result bus is presented for issue, the selector 363 can hold issue if both buses are occupied. The CWRD portion forwarded to the selector also contains information relating to vector instructions. If, for example, a vector instruction requiring operand and result buses is presented for issue, the selector 363 will inspect the contents of the timing chain registers beginning with those in the time slot indicated by the instruction operation time and continuing to the left of those to the end of the longest timing chain. This is done since all vector instructions continue for an indeterminate length of time; that is, a vector instruction can be interrupted when a vector memory coupler loses a contest for a memory location or when a vector read pointer approaches to within the predetermined distance D of its associated write pointer.

The A register timing chains 353 and 355 are shorter than the S timing chain 350 because, generally, there are no long-operation-time instructions which write to A registers. The S timing chain 350 is as long as the longest possible functional unit time; the two S chains 350 and 351, however, are combined to the left of the fifth timing slot in order to guarantee an empty slot for an S register write from memory (described below) whenever it may finally decide to enter one of the chains 350 or 351. Resource scheduling records from the chain 350 will pass from time slot 6 to time slot 5 in chain 351 if there is no scalar memory read entering at that point; if there is, however, the records pass to time slot 5 in the chain 350. Therefore, scalar instructions have their write slot determined at the time they pass to time slot 5, instead of at the time of issue.

The memory request generator consists of the two serially connected registers 370 and 371, which are clocked by the qualified scalar memory acknowledgment signal (SMACKQ) provided by the write stage selector 362. As described above, the scalar memory coupler has a two-deep queue for scalar memory references, therefore, that queue is reflected in the RCU scheduling of buffer resources required to execute the queued operations. Scalar memory instructions are kept track of by the registers 370 and 371 in order to predict when read data will return from memory or when the memory will be in a condition to receive scalar data. The registers 370 and 371 are conditionally loaded, taking into account the memory coupler status (SSTATUS) provided by the MCU 46. If the status indicates that the scalar memory coupler queue is full, the HI signal will be generated by the busy bit selector 363. However, if the status signal permits, the buffer resource scheduling for the reference is loaded into the register 370. This information includes designation of the destination S or A register and designation of whether the reference is SCMRD or SCMWR. When the register 370 is loaded, its valid bit is set and, the next A clock cycle the contents are transferred to register 371 if the valid bit in that register indicates that it is not holding resource scheduling data for a prior scalar memory reference. If the register 371 valid bit is set, the contents of the register 370 are clocked forward by SMACQ. When scalar memory scheduling information is staged to the register 371, it remains there until the first SMACQ following its entry, at which time it is routed either to the S chain 351 or to the A chain 355 if a SCMRD operation. SCMRD resources are provided to the chains 351 and 355 at time slot 5 since, as will be recalled, five bus transfer cycles are consumed by the main memory before it provides data in respone to read control and address signals. In the event that the register 371 holds the resource allocation for a SCMWR instruction, the scheduling information consists of the necessary controls to read the designated S or A register and includes enable signals for latch 121 and the driver 98b. Enabling the latch 121 and driver 98b permits staging of a scalar from the clocked register 120 onto the MSC bus in synchronism with the A clock.

SCALAR CONTROL UNIT

Figure 17:
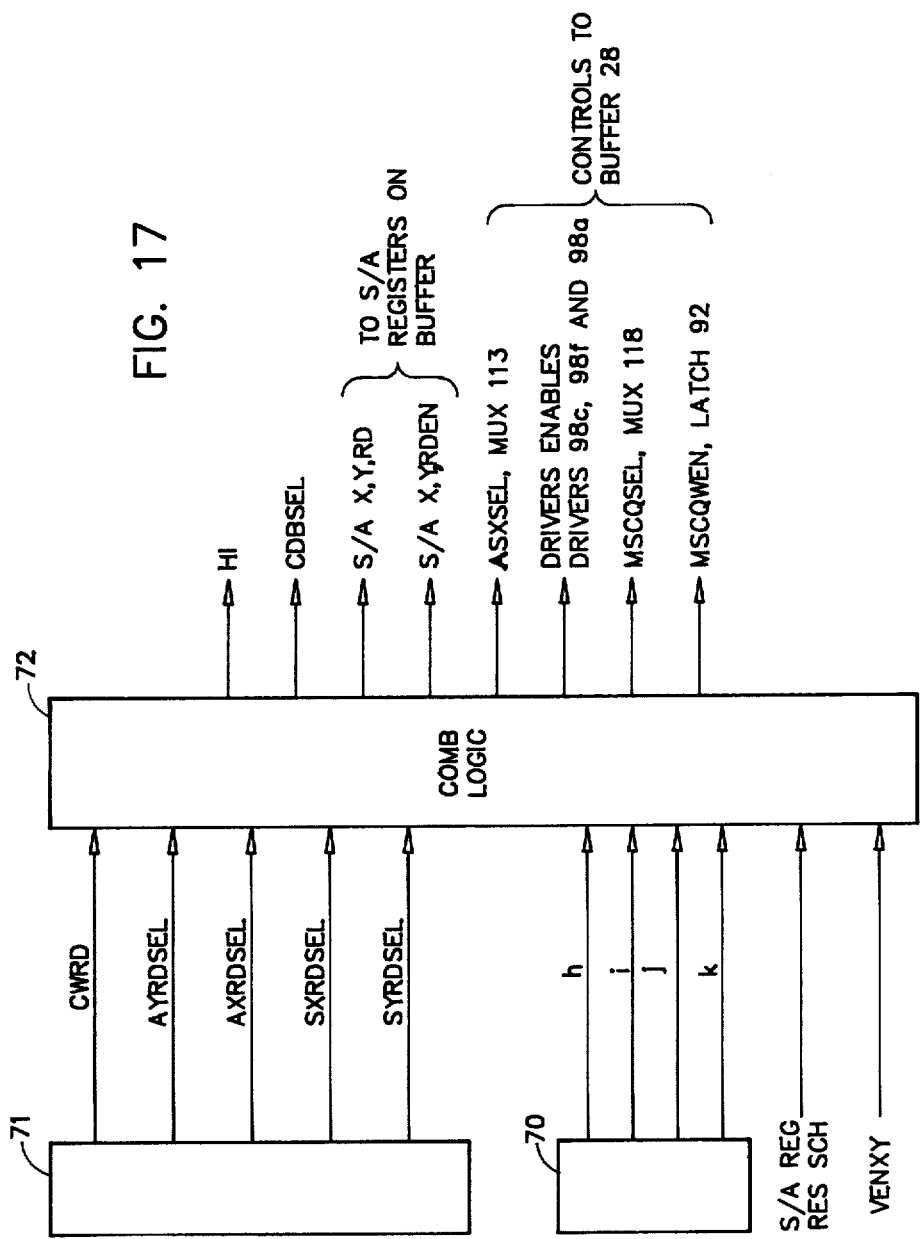
FIG. 17 is a block diagram of a scaler controller which controls the transfer of scaler data objects from the scaler registers of the buffer to the memory and functional unit buses.
Figure 18:
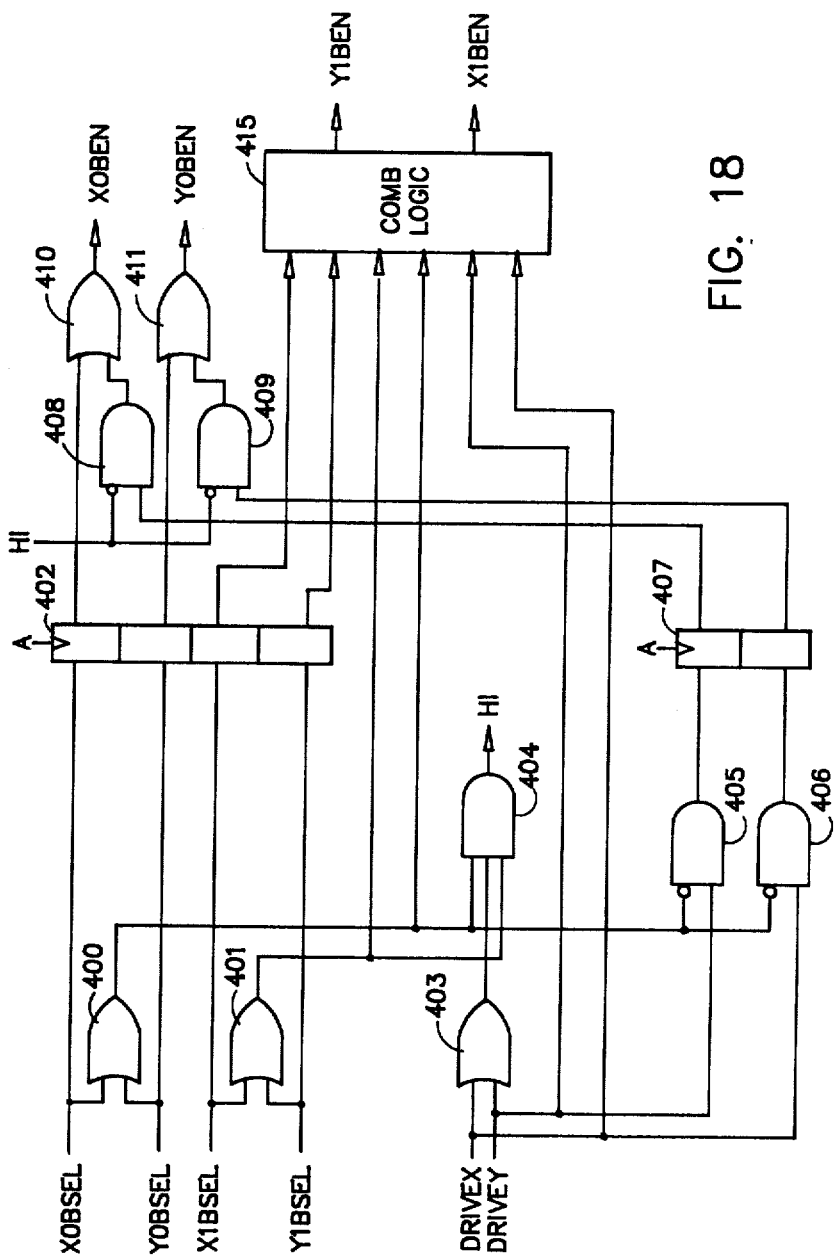
FIG. 18 is a latch enable circuit in the scalar control unit.

Refer now to FIGS. 17 and 18 for an understanding of the SCU 50. The SCU includes control logic 72, which consists of standard combinational logic. The logic 72 receives the h, i, j, and k fields of the current instruction from the register 70, as well as four respective signals from the decoder 71. The four respective signals, AYRDSEL, AXRDSEL, SXRDSEL, and SYRDSEL, denote that the current instruction requires reading the X or Y port of a S or A register. Based on the condition of the select signals, and the data in the received instruction fields, the combinational logic produces and forwards the XRDEN, YRDEN, XRD, and YRD signals for the selected registers. These signals are fowarded to the S or A registers, where they effect control in the manner illustrated in FIG. 5A. This control is qualified by the S/A register result schedule information (S/A REG RES SCH) received from the RCU 54. If an S or A register required to be read by the current instruction has been entered into the resource scheduler of the RCU 54, the data in the register is stale and the logic 72 generates an HI. This HI indication lasts until the contents of the register to be read have been brought current; this is indicated by a signal from the RCU, which clears the SCU's HI for the concerned register.

In addition to the register port select signals just described, the logic 72 receives other portions of the CWRD that notify the logic 72 of an impending scalar instruction requiring use of the scalar memory bus or one of the operand buses. In the case of an SCMWR instruction, the logic 72 provides a select signal (MSCQSEL) to the multiplexer 118, depending upon whether the memory write source is an S or an A register. In addition, a latch enable MSCQWEN is provided to the latch 92 that strobes the data into the latch through the multiplexer 118. Once entered into the latch 92, the data is transferred by the following A phase clock to the clocked storage element 120, where it resides until the latch 121 is enabled by the response of the RCU 54 to the SMACKQ from the MCU 46, indicating the availability of the memory storage location to which the scalar is to be written.

When a scalar is to be placed on an X data path of one of the operand buses, the combination logic 72 provides a select signal ASXSEL to the multiplexer 113 to route the scalar data from the X port of either the S or the A register. During operand bus transfers, the SCU 50 is also responsible for providing enable signals to the drivers 98c–f. Thus, if both operand buses for the current instruction are to be provided with scalar data, the SCU 50 provides the ASXSEL signal to the multiplexer 113 and enables one of the drivers 98c or 98d and one of the drivers 98e or 98f. In this case, it is assumed that at least one operand bus pair is available. When not utilizing an operand bus, the VCU 52 conditions the select signal to the pair of multiplexers (100 and 103 or 101 and 104) to a default state which selects a scalar source for the bus. This provides conductivity from a pair of S or a pair of A registers to a free one of the operand buses for transfer of a pair of scalar operands to a functional unit.

The logic 72 also receives the bus select signals from the VCU 52 (explained with reference to FIG. 12) to permit monitoring of the availability of the operand buses. In the event that a scalar instruction requiring use of an operand bus is presented for issuing, the logic 72 will generate an HI signal if the bus select signals from the VCU indicate that neither bus is available. The signal will be suppressed when an operand bus becomes available.

The SCU also has the responsibility to provide the select signal (CDBSEL) to the multiplexer 126 to select a CDATA bus source during, for example, a vector memory reference instruction. In this case, the SCU also responds to the instruction fields designating the A(0) and A(k) registers to provide a sequence of A register control signals for reading first A(0), then A(k) on successive A clock cycles.

FIG. 18 illustrates a driver enable circuit included in the SCU which generates the driver enable signals (Y0BEN, X0BEN, Y1BEN, and X1BEN) that are provided to enable the drivers 98c, 98e, 98d, and 98f, respectively, as needed. The signals developed by the VCU 52 (FIG. 12) are received by a gating and registration circuit consisting of a pair of OR gates 400 and 401, a 4-way latch 402, an OR gate 403, and an AND gate 404. The select signals produced by the VCU are clocked into the 4-unit latch 402 by the A clock cycle following issue of the instruction resulting in production of the signals. During the first cycle of the A clock in which an instruction requiring use of an operand bus is ready for issue, the CWRD received by the decoder 71 results in production of a pair of signals, DRIVE X and DRIVE Y, indicating a requirement for the bus and fed to the OR gate 403. The OR gates 400 and 401 monitor the availability of the X0/Y0 and X1/Y1 operand buses, respectively, and generate availability signals that are provided, together with the output of the OR gate 403 to the AND gate 404. In the event that at least one data path of both operand buses are busy and an instruction requiring an operand bus is ready for issue, the gate 404 will generate an HI signal that will keep the instruction from issuing. Since the gate 404 monitors the use of the operand buses by the VCU, when the VCU relinquishes control of both data paths of an operand bus, the output of the gate 404 will fall, removing the objections of the SCU 50 to issuing the instruction.

Assuming that the first operand bus is not currently being used for a vector transfer, and assuming that either a scalar or vector instruction requiring an operand bus is being presented for issue, the inputs to the AND gate 405 will be as follows. The OR gate 400 output will be deactivated, indicating the availability of the operand bus. Since this signal is inverted at the input to the gate 405, the DRIVE Y signal will cause the output of the gate 405 to rise. If both signal paths of the operand bus are required, the output of the AND gate 406 will also be activated. The gates 405 and 406 are fed to a 2-way latch 407, which will retain the states of the gates at the first A phase clock following issue of the instruction. The outputs of the latch 407 are fed through the AND gates 408 and 409 to the OR gates 410 and 411, respectively, (assuming that the instruction has issued and that HI is negative). In this case, the Y0BEN and X0BEN signal states will be provided to the drivers 98c and 98e, respectively, in the buffer (FIG. 4) to transfer data from a S, A, or V register onto the Y0 and X0 data paths of the first operand bus. Thus, the enable signals Y0BEN and X0BEN are provided when the Y0 operand path is not busy and a Y operand path is required and when the X0 operand path is not busy and a X operand path is required, respectively. Combination logic 415 similarly produces a pair of enabling signals for the drivers 98d and 98f, with the addition that either or both of the signals are provided under the condition that operand bus signal paths are required, the second operand bus is unoccupied, and at least one data path of the first operand bus is being utilized.

It should be evident that the circuit of FIG. 18 will produce the necessary enabling signals automatically on the first bus transfer cycle following issue of an instruction requiring an operand bus. This occurs without regard to whether the instruction is a scalar or vector instruction. Then, assuming the instruction is a vector instruction, the VCU continues to present xxBSEL signals until the instruction has finished executing.

MAIN MEMORY

The main memory 8 is conventional in all respects and requires a certain amount of setup time to execute a memory reference operation. In the preferred embodiment, the main memory 8 requires a single bus transfer cycle to receive a data element to be written to an indicated address, but requires five bus transfer cycles to set up for reading a data element onto one of the memory databuses. Therefore, the MCAU 155 provides the MACKxWT signals during the same cycle phase that the coupler dispatches the control and address signals to the main memory; this indicates to the concerned control units that the data element can be entered into memory during the corresponding phase of the succeeding cycle.

If the VCU places the data element on a bus for transfer, it provides the MEMOK signal to the MCAU during the data phase of the following cycle. Assuming that the MEMOK is received, the memory coupler will go to a nonbusy status if the transfer was scalar or will increment its address to the next memory address if the operation is a vector memory reference.

If the main memory is being read for transfer of data to the buffer, the MEMACK signal produced by the MCAU will indicate to a control unit that the data obtained from the main memory will be on a bus during the result phase of the fifth cycle following production of the acknowledgment signal.

The interface of the main memory 8 with the scalar and vector memory databuses is represented by the block diagram of FIG. 19. In FIG. 19 one of the IMU's (indicated by 420) is connected to the scalar or one of the two vector memory databuses for providing a data element during the result phase of a bus transfer cycle through one of the B-clocked latches 422. The latches 422 are connected to respective memory databuses through bus drivers (not shown) that correspond to the drivers 98b, 98g, and 98h, with the exception that the memory drivers are clocked by SCK; this drives the contents of the latches 422 to the memory bus during the result phase of a transfer cycle. As will be evident, data provided through one of the latches 422 and transported during a cycle result phase on a respective one of the memory databuses will be clocked by a cycle of the A phase clock into one of the registers 80, 83, 84. Entry of data into the IMU 420 over one of the memory databuses is handled by the circuit consisting of the 3-to-1 multiplexer 424 and the register 425. The multiplexer 424 selects one of the memory databuses for connection to the write (W port) of the IMU 420 through the register 425. Since data will be placed on one of the databuses by one of the registers 97,121 by the A clock, it should be evident that the data will be transferred from the buffer to the main memory during the data phase of a bus transfer cycle, and will be captured from the respective memory bus on which it is transferred when the register 425 is clocked by the B clock that begins the result phase of the same transfer cycle.

Control of memory reference operations against the IMU 420 is effected by a conventional control decoder 427 which receives the CONTROL and memory address MADD signals on one of the control buses MC0-MC3. The control decoder 427 is activated by recognizing an address on one of the memory control and address buses as being located in the IMU 420.

FUNCTIONAL UNITS

Functional unit operations are represented by the block diagram of FIG. 20 where a functional unit is shown controlled by the FCU 56. All operations which require the use of a functional unit, whether vector or scalar, are decoded by the RCU 54 so that the appropriate CWRD conditions may be sent to the FCU 56. The FCU 56 utilizes the FDB to transport command and control data required to identify a functional unit required by a current instruction, connect the functional unit to the operand and result buses allocated for execution of the instruction, and to inform the functional unit when the last operand has been placed on the assigned operand bus. Functional units required by vector instructions are marked busy in the FCU 56 until the operation is complete, so that other attempted use of that functional unit will cause generation of an HI signal. In this case, the RCU 54 monitors FCU status.

In FIG. 20, the functional unit 430 receives operands from a respective one of the operand buses through a crossbar circuit consisting of the multiplexers 432 and 433 and the two latches 435 and 436. The functional unit 430 provides results through a result crossbar network consisting of a multiplexer 438 and a pair of latches 440 and 441. The latches connect to the result buses through latches (not shown) which drive the result buses in the manner described above for the main memory. A conventional control decoder 442 receives control signals, including an identification signal and crossbar configuration signals from the FCU 56 whenever an instruction requiring the functional unit 430 issues. In addition, the decoder 442 receives the LAST ON X0Y0 and LAST ON X1Y1 signals generated by the VCU on a pair of signal lines 444 and 445.

At the beginning of an instruction involving the functional unit 430, a portion of the CWRD produced by the control decoder 75 is provided to the functional control unit (FCU) 56. The FCU 56 receives a portion of the CWRD from the control decoder 75 and, from the VCU 52, receives the LAST0 and LAST1 (FIG. 12) signals and the GO ON X0Y0 and GO ON X1Y1 signals (FIG. 15).

Each time the FCU 56 detects that a functional unit is required by an issuing instruction, it maintains a record of the identification of the functional unit. When the instruction issues, the FCU 56 forwards to the identified functional unit a message that identifies the unit and the operand and result buses assigned to complete the instruction requiring the functional unit. This information is obtained from the SCBD0 and Y0 BSY signals. This message is recognized by the control decoder 442 associated with the functional unit. The decoder recognizes the unit's identification and decodes the operand and result bus designations to produce control signals that establish conductivity between the functional unit and the assigned operand and result buses. Then, the functional unit through the decoder monitors the GO ON signal for the designated operand bus to recognize when a pair of vector operands streaming to the functional unit are interrupted either by stale data in a vector register or by loss of a memory contest. This will cause the functional unit 430 to skip a functional cycle in synchronism with the last vector operand bus transfer.

The functional unit 430 is freed for further assignment when the FCU 56 detects from the LAST signal associated with the operand bus to which the unit is connected that the last vector operand elements have been placed on the operand bus pair assigned to the functional unit.

The data interface between the functional unit 430 and the operand and result buses is accomplished by clocking the registers 435 and 436 in the latches 440 and 441 off of the B-clock and through S-clocked drivers (not shown). This ensures that data placed on the operand buses from one or more of the latches 93-96 during the data phase of a bus transfer cycle will be clocked at the end of the phase by the B clock pulse that cleaves the transfer cycle into the data and result phases. Similarly, data is clocked onto the result buses by action of the B-clocked latches 440 and 441 whence it is captured on the A clock by one of the registers 81 or 82.

VECTOR OPERATIONS

Figure 21:
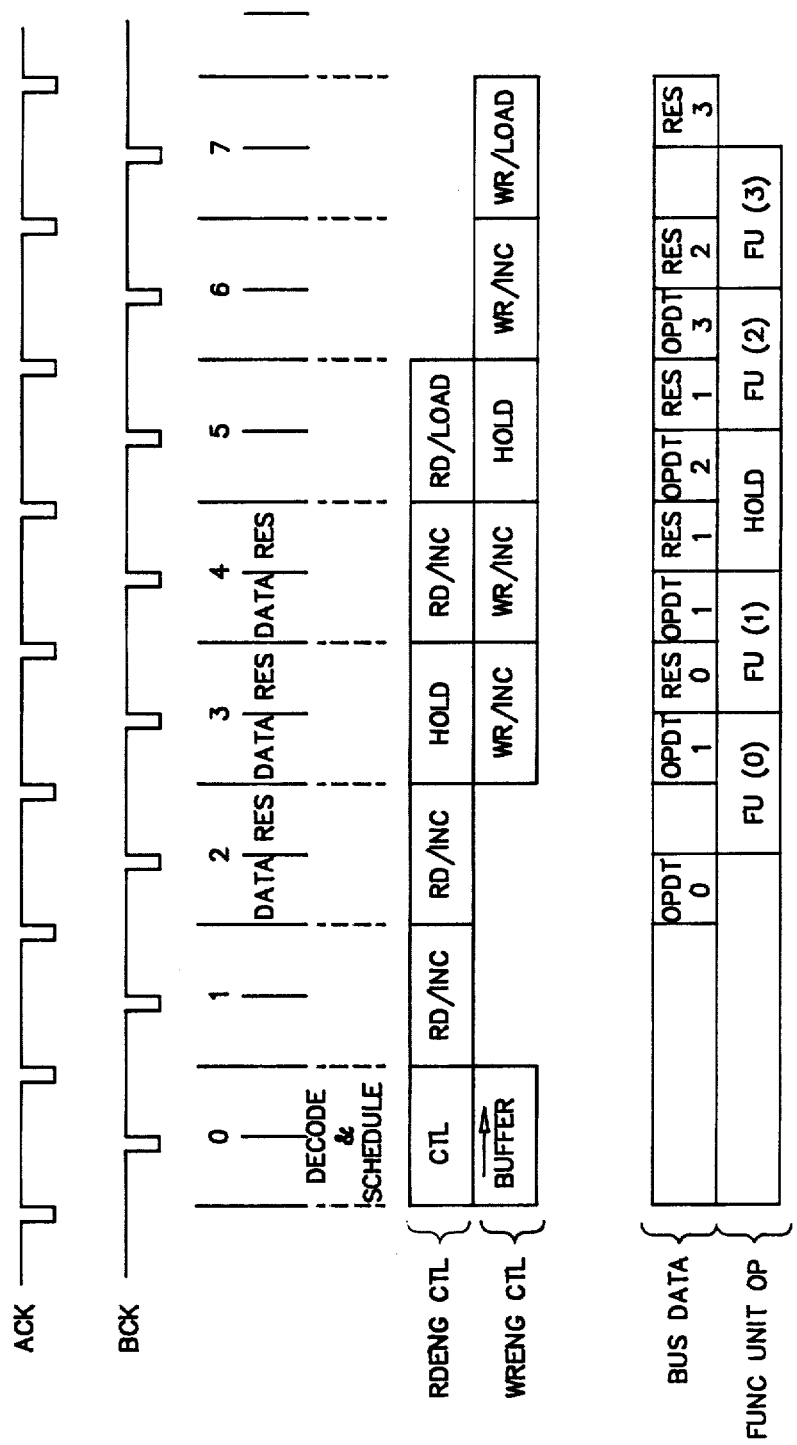
FIG. 21 is a timing diagram illustrating the operation of the invention during execution of a vector instruction involving a functional unit.

Refer now to FIG. 21 for an understanding of vector operations involving a functional unit. In FIG. 21, the instruction is assumed to be an instruction register at the beginning of the operation, that is, during the first transfer cycle, denoted as cycle 0 in FIG. 21. At this time the op code of the instruction is decoded, the CWRD is produced and the VCU determines whether any of the hold issue conditions exist. During cycle 0, the CWRD prompts the VCU to check the V registers denoted by the i, j, and k fields of the instruction against the busy flags of the read and write engines associated with the registers. Recall that the i field identifies the V register to which the result of the instruction execution is to be written. If the i field indicates a V register that is being read from or wirtten to, the VCU will assert its HI signal. The status of the read engines controlling the V registers indicated by the j and k fields of the instruction are inspected; the state of the write engines for these registers is not taken into account in determining whether the instruction issues, because a V register can be concurrently written to and read from so long as the write operation leads the read operation by the predetermined distance D.

With regard to bus reservation during cycle 0, the CWRD will indicate that an operand bus is required for an operation. The SCU will hold issue of the instruction if both operand buses are bust. The SCU assertion of its HI in this circumstance can be understood with reference to the discussion above regarding the AND gate 404 in FIG. 18. Assuming that an operand bus is available, the operand scheduler of the VCU will schedule an operand bus pair in association with registers V(j) and V(k) as described above. The scheduled operand bus is used in instruction issue to conduct a string of operand data element pairs fed from the registers V(j) and V(k). The string of operand pairs constitutes the concurrent, parallel streaming of the vectors in the registers V(j) and V(k) to a functional unit. The scheduling algorithm to decide which operand bus is enabled is use the first operand bus if not busy, and use the second operand bus if the first is busy. The scheduling is done on both the vector operand bus scheduler (FIG. 12) and the SCU driver control (FIG. 18). At the time of issue, the flip-flops in the VCU operand bus schedule are set indicating the busy status of a bus according to the result of the scheduling, while the latches 402 in the SCU latch enable are set during cycle 1. All VCU operand scheduling flip-flops set at instruction issue will stay set according to the result of the scheduling until the LAST transfer on the scheduled bus is in progress. Then the LAST signal will reset the VCU operand schedule flip-flops, which will cause the SCU latch 402 to clear on the following cycle.

At the time of issue (cycle 0) a result bus is scheduled and reserved for the vector operation. The algorithm used is the same as that used for the operand buses. As stated above, result buses can be reserved by scalar operations, so the HI assertion when both result buses are busy is the responsibility of the RCU. If the Y0 result bus is busy, the RCU will assert RVY0BSY to the VCU result scheduler (FIG. 13), and Y1 will be reserved for the vector operation. At the time of issue, the result bus is scheduled for returning the string of result data elements produced by a functional unit in response to the string of operand data element pairs transferred on the scheduled operand bus. As described above, the result bus is associated with the vector V(i) by action of the VWRENGi. The scheduled result bus will remain reserved until the ViBSYx signal produced by the engine is deactivated at the beginning of the transfer cycle following the countdown circuit reaching a count of one.

Finally, during cycle 0, a determination is made whether the functional unit required by the instruction is available. If involved in execution of a prior vector instruction, the functional unit will be marked busy and the instruction will not issue. Assuming availability of the functional unit and all of the above-described resources necessary for execution of the vector instruction, the instruction will issue.

During the decoding and scheduling operations of cycle 0, control is sent to the buffer 28 to configure the necessary multiplexers to provide conductivity between the scheduled V registers and the reserved operand and result buses. These are indicated as select (SEL) signals in FIGS. 11 and 12.

Assuming a vector length of 4 (vector elements 0-3 from least to most significant), the operations of the read and write engines and the staging of data onto scheduled buses can be understood with reference to FIG. 21.

As an operand bus is set busy during the first cycle, the selection of the vector register or registers to be connected to the operand bus is provided to the buffer in the form of select signals for the required multiplexers. In this regard, the select signals (VxxSEL) for the multiplexers 106-109 come from the VCU result scheduler (FIG. 13), while the select signals for the multiplexers 100-104 are provided from the operand bus scheduler (FIG. 12). The select signals provide the routing from the V register or registers to the selected operand bus.

On the second cycle following vector instruction issue (cycle 1), the xxBSY signals produced by the VCU operand scheduler are registered on the A clock into the SCU by the latch 402. The latch 402 provides a one-cycle delay in clearing the enable signals so that when the VCU operand bus scoreboard flip-flops are cleared by a LAST signal on the last cycle of an instruction sequence, the change in state of those flip-flops is not felt until the SCU latches 402 (FIG. 18) are cleared on the A clock of the following transfer cycle.

Once connectivity between the selected registers and assigned bus is established, a succession of signals incrementing the read pointer of each selected register must be provided. The succession of RDCTL signals for the required register are provided directly from the read engine selected by the instruction decode cycle. The read (and write) pointers of a vector register having been initialized to 0 (first vector element) increment toward the last element. As the vector instruction execution proceeds, the validity of each pair of operands on the assigned operand bus must be established. Thus, if a register on one of the signal paths of the assigned bus is active but its contents are stale, a HOLD signal must be sent to the functional unit and to the other vector read engines involved in the instruction execution. The HOLD inhibits advancement of the read pointers for the vectors and inhibits the functional unit from incrementing its operation. Thus, assuming there are no memory conflicts and that the vector elements being read are fresh, RDCTL signals are provided once each transfer cycle to increment the vector pointers. As will be evident from an inspection of the timing diagram of FIG. 6B and the block diagram of FIG. 6A, a vector register is read during the result phase of a bus transfer cycle so that the read element can be strobed from the required bus latch (FIG. 4) through a driver on the S clock cycle defining the following bus transfer cycle. Therefore, the read operation and RDCTL increment pulse are shown being provided during the second cycle (cycle 1) of FIG. 21, while the operand bus data OPDT0 is shown being transferred on the bus during the data phase of transfer cycle 2. During transfer cycle 2, OPDT1 is being read out of a vector register and is latched to the assigned operand bus during the data phase of transfer cycle 3.

Assume V register data becomes stale during cycle 2, then both registers being read are provided with the HOLD states of their respective RDCTL signals for each clock cycle that the data is stale. A HOLD state corresponds essentially to the inactive state of the GO on signal for the assigned operand bus produced by the result scheduler of FIG. 15. This is represented in FIG. 21 by a HOLD entry for the read engine control in cycle 3.

Provision of the HOLD state will prevent the read engines from incrementing their respective register pointers during the cycle that the HOLD occurs. This will result in invalid data being provided on the assigned operand bus. However, during the functional unit cycle spanning transfer cycles 4 and 5, the functional unit will suspend operations, as indicated by the HOLD entry in the functional unit operation sequence, thus ignoring the invalid operand data of cycle 4.

Following the HOLD of cycle 3, the read engine controls provided by the VCU will resume their increment states and cause the affected pointers to increment in cycle 4. When the countdown circuits of the affected vector registers have reached 0, indicating the last of the vector elements are on the operand bus, the read engines place their RDCTL signals in a LOAD state, which causes the read pointers to be initialized to the first vector element in the register following bus cycle.

It should be noted with reference to FIG. 6A that the phasing between incrementing vector read pointers and provision of vector register data onto a bus is such that an increment signal is entered into the first stage of registration in the vector register control circuitry by the B clock, but does not cause an increment of the pointer until the following A clock. Thus, an increment that is provided to a V register during cycle 1 of FIG. 21 actually reaches the read pointer during the data phase of cycle 2. The V register responds to the incremented pointer value during the result phase of cycle 2 and the read element is driven to the bus during the data phase of cycle 3.

Once a V register or V register pair is enabled to an operand bus for functional unit operation and the result bus is reserved for that operation, the scheduling for the write operation to the V register specified to receive the result begins. As stated above, each vector operation involving a functional unit has a functional unit time equal to the number of transfer cycles that the functional unit takes to produce a result. Further, the result scheduler 184 has a variable delay timing chain, with the delay established by the functional unit time decoded at instruction issue. For example, the timing chain consisting of delay elements 310–313 is illustrated in FIG. 15 for the Y0 result bus. It is understood that the block 316 in FIG. 15 comprises a timing circuit for result bus Y1 that is equivalent in all respects to the Y0 result bus timing circuit. At instruction decode the functional unit time is included in the CWRD portion provided to the VCU and is latched into the timing circuit for the scheduled result bus to establish the time delay for the circuit. As explained above, the operand bus GO ON signal is steered to the correct result bus timing chain by the circuit 305. After an appropriate functional unit delay time, the correct result bus timing chain produces a GO ON result bus signal which will enable the write engine to provide a WRCTL signal state that will increment the write pointer of the register associated with the selected write engine. The GO ON signal will also decrement the length counter.

As stated above, the selected write engine produces all of the signals necessary to connect the selected V register to the assigned result bus. These include: VxWRCTL, VxWREN, and VxWRSEL. The stream of these write engine control signals to the V register being written in the context of the example is illustrated in FIG. 21. In FIG. 21, the write engine is scheduled during cycle 1, at which time the write pointer it controls, having been initialized at the end of the previous vector instruction execution sequence, continuously writes to the initial address whatever is on the result bus to which it is connected. At the provision of the first GO ON result bus signal from the result scheduler, which is received during cycle 2 of FIG. 21, the increment state for the WRCTL signal provided to the V register is delayed until the middle of cycle 3 by virtue of having to be staged through two B-clocked storage elements (the register 147 and write pointer 150 in FIG. 6A). Thus, in cycle 3, the functional unit provides its first output to the result bus during the cycle's second phase. Referring to FIG. 6A, it can be seen that this result will be entered into the buffer register terminating the result bus at the beginning of cycle 4, written to the register during the write portion of the VSTROB signal provided to the register (FIG. 6B) just prior to the positive B clock edge that increments the write pointer to the V register address specifying the location of the next result element.

As can be seen from FIG. 21, the combination of result scheduler delay and the one cycle staging time through the vector register write control circuitry results in the operand HOLD condition of cycle 3 being implemented in the write control circuitry in cycle 5. The write control HOLD of cycle 5 places the WRCTL signal in a HOLD condition which prevents the write pointer from incrementing. This does not invalidate the result data written to the held address since the result data is still held in the functional unit register driving the assigned result bus.

Following the HOLD signal which suspends its operations, the concerned write engine operates as described until its countdown circuit causes the WRCTL signal to assume a LOAD state. At this time the VxBSYx signal asserted by the write engine is also deactivated, freeing the result bus for further assignment.

In executing a VCMRD instruction which requires a vector to be read from memory and written to a vector register, two decoding and scheduling cycles are required to schedule the resources required to execute the instruction. During the first of the decode and schedule cycles, the SCU 50 ascertains whether the contents of the register A(0) are stale, while the VCU 52 inspects the availability of the V(i) register specified by the instruction i field. Assuming the availability of both resources, during the second cycle of the instruction, the SCU 50 sends the controls of the buffer necessary to place the contents of the register A(0) onto the CDATA bus, while it inspects the freshness of data in the A(k) register. During the second cycle the MCU 46 addresses its resource inventory to determine whether a vector memory coupler and databus are available to execute the instruction. This availability is indicated to the VCU in the form of the VECRDOK and VECRDBUS signals. If these MCU-supplied signals indicate nonavailability of memory resources, the VCU will hold issue of the instruction until the memory resources become available. During the third cycle of the VCMRD instruction sequence, the MCU address adder obtains the contents of the A(0) register from the CDATA bus and calculates the first address, while the SCU 50 provides the controls to the buffer 28 necessary to place the contents of the A(k) register on the CDATA bus. In the fourth cycle of the VCMRD instruction sequence, the memory address increment (contents of register A(k)) is obtained by the memory coupler assigned to execute the instruction sequence from the CDATA bus; at the same time the coupler asserts a request for access to the address of the first vector element. In the fifth cycle of the instruction sequence, assuming no loss of contest for the first requested memory location, the memory coupler sends the control and address information to the main memory necessary to read the first vector element from its memory location. Simultaneously, the coupler sends the MACKxRD signal to the VCU. The MACKxRD is referred to the memory bus assigned by the MCU, which will have been indicated to the concerned write engine by the result scheduler (FIG. 13). The third task completed by the memory coupler involved in the sequence is to request the next memory location. At any time during the sequence that the coupler loses a contest for a requested memory location, it does not produce the MACKxRD signal required to increment the write engine involved in the execution sequence. During a VCMRD operation the write engine involved in the execution will operate incrementally as described above. This incremental operation will only be dependent on delays caused by memory conflicts lost by the associated memory coupler. These delays are accommodated by inhibiting the correct MACKxRD signal the appropriate number of transfer cycles. The delayed MACKxRD signal constitutes the GO ON memory signal required to increment the write engine operation.

Execution of a VCMWR instruction also requires two initial cycles of decoding and scheduling in order to transfer the A(0) and A(k) register contents to the assigned memory coupler. Instruction issue determination is made by the SCU 50 in response to stale data in either of these registers; and by the VCU in response to VECWROK and VECWRBUS signals provided by the MCU 46. These signals will condition the read engine for the register V(j) to go active at the time of issue and will properly link the activated read engine with the proper memory databus. The conditioning will further condition the memory operand scheduler (FIG. 14A) to route the MACKxWT/VxGO combination back to the assigned read engine as a GO ON Mx signal. Two things can contribute to slowdowns in data being read from the vector registers to the memory. One condition is the memory contest loss mentioned above. This condition is detected by the assigned memory coupler and, one transfer cycle prior to the inability to write bus data to the memory, the coupler stops asserting the MACKxWR signal. The other reason for interrupting a transfer from the V(j) register to the main memory occurs when the vector read engine detects that the register contains stale data. The detection of this situation has been explained above in regard to providing operand vectors to a functional unit.

SCALAR OPERATIONS

The execution of scalar instructions can be understood by consideration of the following sequence of instructions: read S(1) from memory (SCMRD); read S(2) from memory (SCMRD); floating add S(1)+S(2), result to S(3); and, store S(3) to memory (SCMWR). Assuming that the addresses for the memory references are available, that is, the contents of register A(h) are not stale, the execution proceeds according to the following sequence of transfer cycles.

Cycle 0. The first SCMRD is decoded and resource availability is inspected for scheduling. This includes the inspection by the RCU 54 of the SSTATUS signal to assess the availability of the scalar memory coupler and MSC bus to execute the instruction. Assume availability of these resources; the RCU will permit the instruction to issue.

Cycle 1. The second SCMRD is decoded and resource availability checked. Assume availability of the scalar memory coupler and the MSC bus; this means that the two-deep queue of the coupler is populated only by the SCMRD instruction. At this time the CWRD from the RCU is provided to the MCU and the A(h) register contents and the displacement for the memory address of the first SCMRD are sent to the MCU. During this cycle the scheduling information relating to the first SCMRD instruction is staged into register 370 of the RCU (FIG. 16).

Cycle 3. During this cycle the floating add instruction is in the instruction registers. The SCU will hold issue of the instruction because the contents of the register S(1) are stale, the register being scheduled by the RCU. The contents of A(h) and displacement for the second SCMRD instruction are sent to the MCU. Assuming no memory conflicts, the scalar memory coupler transmits the address and memory read control signals on the MC3 control bus to the memory and the SMACK is sent back to the RCU. The first SCMRD scheduling information is clocked to register 371, while the SCMRD scheduling information is staged into the register 370.

Cycle 4. The floating add instruction is still in the instruction registers. The instruction still will be restrained from issuance by the SCU because both S(1) and S(2) have been scheduled by the RCU for receiving the results of a respective SCMRD instruction. The scalar memory coupler now sends the address of the second SCMRD to the main memory and acknowledgment of this to the RCU in the form of the SMACK. Receipt by the RCU of the first SMACK results in transfer of the first SCMRD into the timing chain 351 and staging of the second SCMRD scheduling information into register 371. It should be appreciated here that the floating add instruction will not be issued until both of the SCMRD instructions have propagated through the timing chain 351, which will result in dropping of the stale data assertion by the RCU.

Cycles 5-7. During these transfer cycles, the floating add instruction is still held in the instruction registers while the first and second SCMRD scheduling information is propagated through the timing chain 351 of the RCU.

Beginning with cycle 8, the data read from the main memory in response to the first SCMRD instruction is on the MSC bus. Here the timing chain 351 provides the controls to the buffer necessary to write the scalar to the S(1) register. The scheduling information for the second SCMRD has now propagated to register 1 in the timing chain 351.

Cycle 9. Here, the data from the first SCMRD instruction is written to register S(1) and the controls are sent to the buffer to enable data now on the MSC bus as a result of the second SCMRD to be written to the register S(2). The RCU indicates that information has been written into the registers. With the fresh information indicators for registers S(1) and S(2) being provided, the SCU determines the availability of an operand bus pair (FIG. 18), while the RCU determines the availability of a result bus in four cycles and a write slot for register S(3) in five cycles. Assuming resource availablity, neither the SCU or RCU asserts its HI signal and the floating add instruction issues.

Cycle 10. During this cycle the SCMWR instruction is in the instruction registers; this instruction will not issue until controls for writing the result of the floating add instruction to register S(3) are provided by the RCU. Reference to FIGS. 5A and 5B will reveal that, since the register S(2) is written during the first write slot, W0, it can be read in response to the positive edge of the ACK cycle terminating cycle 10. Therefore, both registers, S(1) and S(2), are read during this cycle. Coincident with the reading, the operand bus enable signals registered into the operand bus scheduler of the SCU (FIG. 18) strobe the data read from the registers into the latches of the assigned operand bus. Control is also provided from the FCU 56 that connects the floating add functional unit to the specified operand and result buses.

Cycle 11. Since the contents of register S(3) are still stale, the SCU 50 restrains issue of the SCMWR instruction. Here, during the data phase of the cycle, the contents of S(1) and S(2) are on the assigned operand bus and latched to the assigned functional unit at the beginning of the result phase, causing the functional unit to begin the add instruction.

Cycle 12. The floating add functional unit continues its operation and the SCU continues to restrain issue of the SCMWR instruction because the contents of S(3) are still stale.

Cycle 13. Since the RCU has scheduled the result bus to be available this cycle, the RCU drops its stale data indication for register S(3), permitting the SCU to issue the SCMWR instrucion if the scalar memory coupler and MSC bus are available. Assume memory resource availability, and neither the SCU nor RCU asserts their HI signals, thereby permitting the SCMWR to issue. The SCMWR resource information is presented to the register 370 for entry during cycle 14. The floating add instruction is completed and the result placed on the assigned result bus during the second phase of cycle 13. Since the scheduling information for writing the result has propagated through one of the two timing chains of the RCU, the load control circuit terminating that chain now provides controls for writing the result scalar to S(3).

Cycle 14. The write control signals provided during cycle 13 cause the entry of the result scalar into register S(3) and the entry of the SCMWR scheduling information into the register 370. The memory address information from the signal is obtained by the MCU and the main memory write location address is calculated.

Cycle 15. The SCMWR scheduling information is transferred to register 371. Assuming that the SCMWR address is transmitted by the scalar memory coupler to the main memory, the MCU provides the SMACK to the RCU.

Cycle 16. The SMACK causes the SCMWR information to be transferred from the register 371 to the load control circuit 375, resulting in the conduction to the MSC bus of the scalar stored in register S(3). The scalar is on the MSC bus during the data phase of cycle 16 and is entered into the memory by the B clock cycle splitting transfer cycle 16.

The preferred embodiment advances a bus structure in which the data traffic capacity from the vector registers to the functional units has a specific parametric relationship with the data traffic capacity from the main memory to the vector registers. The operand buses have twice the data traffic capacity of the vector memory buses.

For example, if the computation $x = A + B + C + D$ is performed, elements of B, C, and D are brought into the vector registers and then passed back into the functional unit. Intermediate results, $T1 = C + D$, return to vector registers and then back again to the functional unit to be added to B to form a second set of intermediate results, T2, which is also returned to the functional unit to be added to A to form T3. As this example suggests, each set of intermediate results flows in once and out once, resulting in a significant amount of traffic (note that in a more parallel design using multiple adders, T1 may only pass once).

The vector memory busing structure provides, with each vector memory bus, a virtual pair of logical memory buses, one flowing to and one from the "CPU proper" section containing the buffer and functional units. Because each vector memory bus transfers to or from the memory during a respective cycle transfer phase, a trip to and from memory can be completed in one bus transfer cycle. Similarly, the time for vector registers to pass data to and receive data from the functional units is one full cycle.

Obviously, many modifications and variations of the present invention are possible in light of the above teachings. It is therefore to be understood that within the scope of the claims that follow, the described invention can be practiced other than as specifically described.

I claim:

1. In a computer including a memory for storing vector data objects and scalar data objects, said vector data objects each including an ordered array of vector data elements, functional units for performing arithmetic and logical operations on vector and scalar data objects, and a buffer including vector registers for temporary storage of vector data objects and scalar registers for temporary storage of scalar data objects, wherein the improvement is a bi-directional busing system for conducting vector and scalar data objects between said memory and said buffer, and between said buffer and said functional units, said improvement comprising:

clock means for generating a bus transfer signal including multiple bus transfer cycles, each of said bus transfer cycles including a first and a second transfer phase;

multiple, bi-directional vector memory bus means, each of said vector memory bus means connected to said memory, to said buffer, and to said clock means for conducting a first sequence of vector data elements from said buffer to said memory, each vector data element of said first sequence being conducted during the first phase of each of a first succession of bus transfer cycles, while conducting a second sequence of vector data elements from said memory to said buffer, each of a plurality of vector data elements of said second sequence being conducted during the second phase of each of a plurality of bus transfer cycles in said first succession of bus transfer cycles; and multiple, bi-directional, function bus means, each of said function bus means connected to said buffer, to said functional units, and to said clock means for conducting a pair of operand scalar data objects or a pair of operand vector data elements from said buffer to said functional units during the first phase of each bus transfer cycle of a second succession of bus transfer cycles, while conducting a result scalar data object or a result vector data element during the second phase of each bus transfer cycle of a plurality of bus transfer cycles in said second succession of bus transfer cycles.

2. A bi-directional data busing system for conducting scalar and vector data objects in a computer which includes a memory for storing vector and scalar data, a plurality of functional units for performing arithmetic and logic operations on vector and scalar operands to produce vector and scalar results, and a buffer with scalar and vector registers for temporarily holding vector and scalar data, said busing system comprising:

a clock unit for generating a bus transfer signal composed of a sequence of bus transfer cycles, each of said bus transfer cycles including a first portion defining a data transfer phase for transferring data from said buffer to said memory or to said functional units, and a second portion defining a result transfer phase for transferring data from said memory or said functional units to said buffer;

multiple bi-directional memory bus means, each connected to said memory, to said buffer, and to said clock unit for conducting a first vector data element from said buffer to said memory during the data phase of each bus transfer cycle of a first sequence of bus transfer cycles, while conducting a second vector data element from said memory to said buffer during the result phase of a bus transfer cycle of said first sequence;

multiple bi-directional function bus means, each connected to said functional units, to said buffer, and to said clock unit for conducting a pair of operand scalar data elements or a pair of operand vector data elements from said buffer to said functional units during the data phase of each bus transfer cycle of a second sequence of bus transfer cycles, while conducting a result scalar data element or a result vector data element from said functional units to said buffer during the result phase of a bus transfer cycle of said second sequence; and machine control means connected to said memory, to said buffer, to said functional units, and to said clock unit and responsive to a succession of program instructions for selectively connecting a first vector register with a respective memory data bus means to provide said first vector data elements, while selectively connecting a second vector register with said respective memory data bus means to receive said second vector data element, and for selectively connecting first and a second scalar registers or third and fourth vector registers with a respective function bus means to provide said pair of operand scalar elements or said pair of operand vector elements, while selectively connecting a third scalar register or a fifth vector register with said respective function bus means to receive said result scalar data element or said result vector element.

3. The busing system of claim 2 wherein said multiple, bi-directional memory bus means includes a bi-directional scalar memory bus for conducting a scalar data element from said buffer to said memory during the data phase of a respective bus transfer cycle while conducting a scalar element from said memory to said buffer during the result phase of said respective bus transfer cycle.

4. The busing system of claim 2 wherein each of said multiple bi-directional function bus means includes a pair of signal paths, a first of said signal paths being bi-directional, and a second of said signal paths being uni-directional.

5. The busing system of claim 4, wherein said first signal path is for conducting an operand scalar data element or an operand vector data element from said buffer to said functional units during the data phase of a respective bus transfer cycle, and for conducting a result scalar data element or a result vector data element from said functional units to said buffer during the result phase of said respective bus transfer cycle, and said second signal path is for conducting an operand scalar data element or an operand vector data element during said data phase of said respective bus transfer cycle.

6. The busing system of claim 2 wherein each of said bi-directional memory bus means has a memory data element transfer capacity, each of said bi-directional function bus means has an operand data element transfer capacity, and wherein said data element transfer capacity of each of said memory bus means has a predetermined parametric relationship with said operand data element transfer capacity of each of said bi-directional function bus means.

7. The busing system of claim 2 wherein said machine control means includes vector control means for transferring a stream of operand vector data elements from said third or said fourth vector registers to said respective function bus means, while transferring, in synchronism with said stream of operand vector data elements, a stream of result vector data elements to said fifth vector register from said respective function bus means.

8. The busing system of claim 7 wherein said stream of result vector data elements is interruptible and said vector control means includes scheduling means for interruptibly transferring said result vector data element stream in synchronism with interruptions in said stream of operand vector data elements.

9. A method of conducting scalar and vector data in a computer system including a memory for entering vector and scalar data, a plurality of functional units for performing arithmetic and logical operations on vector and scalar operand data to produce vector and scalar result data, a buffer including vector registers and scalar registers, a plurality of bi-directional vector memory buses for conductively connecting said memory with said vector registers, and a plurality of bi-directional function buses for conductively connecting said vector and scalar registers with said functional units, said method comprising the steps of:

generating a bus transfer signal including a string of multi-phase bus transfer cycles, each of said bus transfer cycles including a data phase and a result phase;

identifying a first vector register for temporarily storing a first vector data object, said vector data object including an ordered plurality of vector data elements;

selecting a respective memory bus for conducting said vector data object from said first vector register to said memory;

conducting a first vector data element of said vector data object on said respective memory bus to said memory during the data phase of a first respective bus transfer cycle;

selecting said respective memory bus for conducting a second vector data element from said memory to a second vector register;

conducting said second vector data element on said respective memory bus from said memory during the result phase of said first respective bus transfer cycle; and conducting a third vector data element of said first vector data object on said respective memory bus to said memory during the data phase of a second bus transfer cycle, said second bus transfer cycle following said first bus transfer cycle in said string.

10. A method of conducting scalar and vector data in a computer system including a memory for entering vector and scalar data, a plurality of functional units for performing arithmetic and logical operations on vector and scalar operand data to produce vector and scalar result data, a buffer, including vector registers and scalar registers, a plurality of bi-directional vector memory buses for conductively connecting said memory with said vector registers, and a plurality of bi-directional function buses for conductively connecting said vector and scalar registers with said functional units, said method comprising the steps of:

generating a bus transfer signal including a string of multi-phase bus transfer cycles, each of said bus transfer cycles including a data phase and a result phase;

identifying a first vector register for temporarily storing a first vector data object, said first vector data object including an ordered plurality of vector data elements;

selecting a respective function bus for conducting said vector data object from said first vector register to said functional units;

conducting a first vector data element of said first vector data object on said respective function bus to said functional units during the data phase of a first respective bus transfer cycle;

selecting said respective function data bus for conducting a second vector data element from said functional units to a second vector register;

conducting said second vector data element from said functional units on said respective function data bus during the result phase of said first respective bus transfer cycle; and conducting a third vector data element of said vector data object on said respective function bus to said functional units during the data phase of a second respective bus transfer cycle, said second respective bus transfer cycle following said first respective bus transfer cycle in said string.

11. The method of claim 10, further including the steps of:

identifying a third vector register for temporarily storing a second vector data object, said second vector data object including an ordered plurality vector data elements;

selecting a respective memory bus for conducting said second vector data object from said third vector register to said memory;

conducting a first vector data element of said second vector data object on said respective memory bus to said memory during the data phase of a third respective bus transfer cycle;

selecting said respective memory bus for conducting a fourth vector data element from said memory to a fourth vector register;

conducting said fourth vector data element on said respective memory bus from said memory during the result phase of said third respective bus transfer cycle;

conducting a second vector data element of said second vector data object on said respective memory bus to said memory during the data phase of a fourth bus transfer cycle, said fourth bus transfer cycle following said fourth bus transfer cycle in said string.

12. The method of claim 10, further including the steps of:

identifying a scalar register;

selecting said respective function bus for conducting a scalar data element from said functional units to said scalar register;

conducting said scalar data element on said respective functional bus from said functional units during the result phase of said second bus transfer cycle.

* * * * *